(12) United States Patent
Komori et al.

(10) Patent No.: US 11,865,453 B2
(45) Date of Patent: Jan. 9, 2024

(54) SIMULATION SYSTEM, PROCESS METHOD, AND INFORMATION STORAGE MEDIUM

(71) Applicant: BANDAI NAMCO ENTERTAINMENT INC., Tokyo (JP)

(72) Inventors: Kunito Komori, Tokyo (JP); Hirofumi Motoyama, Yokohama (JP)

(73) Assignee: BANDAI NAMCO ENTERTAINMENT INC., Tokyo (JP)

( * ) Notice: Subject to any disclaimer, the term of this patent is extended or adjusted under 35 U.S.C. 154(b) by 100 days.

(21) Appl. No.: 16/245,588

(22) Filed: Jan. 11, 2019

(65) Prior Publication Data
US 2019/0217202 A1     Jul. 18, 2019

(30) Foreign Application Priority Data

Jan. 12, 2018   (JP) .................................. 2018-003809

(51) Int. Cl.
*A63F 13/65*     (2014.01)
*A63F 13/26*     (2014.01)
*A63F 13/216*    (2014.01)

(52) U.S. Cl.
CPC ............ *A63F 13/65* (2014.09); *A63F 13/216* (2014.09); *A63F 13/26* (2014.09); *A63F 2300/8082* (2013.01)

(58) Field of Classification Search
CPC ......... A63F 13/48; A63F 13/95; A63F 13/493
USPC .......................................................... 463/31
See application file for complete search history.

(56) References Cited

U.S. PATENT DOCUMENTS

| | | | | |
|---|---|---|---|---|
| 6,409,603 | B1 * | 6/2002 | Nishino | A63F 13/47 463/43 |
| 2001/0024972 | A1 * | 9/2001 | Kitao | A63F 13/45 463/33 |
| 2003/0073473 | A1 * | 4/2003 | Mori | A63F 13/577 463/6 |
| 2007/0243920 | A1 * | 10/2007 | Kashima | G07F 17/3293 463/13 |

(Continued)

FOREIGN PATENT DOCUMENTS

| | | |
|---|---|---|
| JP | H11-309269 A | 11/1999 |
| JP | 2006-149950 A | 6/2006 |
| JP | 2013-059573 A | 4/2013 |

OTHER PUBLICATIONS

Article, Pacathon, Bandai Namco Holdings Inc. (JP), Hakuhodo Inc. (JP), Ars Electronica Futurelab (AT), 2 pages.

(Continued)

*Primary Examiner* — Pierre E Elisca
(74) *Attorney, Agent, or Firm* — Oliff PLC

(57) ABSTRACT

A simulation system includes a processor including hardware. The processor is configured to perform an information acquiring process of acquiring position information about a user moving in a real space; a game process for a game played by the user; a virtual space setting process of setting a virtual space; a display process of generating, as a virtual space image, a display image in which an image of a user character corresponding to the user is displayed at a position in the virtual space corresponding to a position of the user in the real space; and a change process of changing, when a change condition is determined to be satisfied, at least one of the image of the user character corresponding to the user, an image of another user character corresponding to the other user, and an image of an disposed object.

19 Claims, 28 Drawing Sheets

(56) References Cited

U.S. PATENT DOCUMENTS

| | | | | |
|---|---|---|---|---|
| 2009/0221368 A1* | 9/2009 | Yen | ............ | A63F 13/30 463/32 |
| 2012/0302340 A1* | 11/2012 | Takemoto | ............ | A63F 13/63 463/31 |
| 2013/0109478 A1* | 5/2013 | Matsumaru | ............ | A63F 13/42 463/39 |
| 2014/0129130 A1* | 5/2014 | Kuramura | ............ | H04W 4/023 455/456.3 |
| 2014/0370992 A1* | 12/2014 | Cudak | ............ | A63F 13/30 463/43 |
| 2015/0105184 A1* | 4/2015 | Anton | ............ | A63F 13/00 473/409 |
| 2019/0054379 A1* | 2/2019 | Ackley | ............ | G06T 19/006 |

OTHER PUBLICATIONS

BANDAI NAMCO Holdings Inc. (JP), Hakuhodo Inc. (JP), Ars Electronica Futurelab (AT), Pacathon, Hatje Cantz Verlag GmbH, Sep. 7-11, 2017, p. 363.

Feb. 9, 2018 Office Action translation issued in Japanese Patent Application No. 2018-003809.

Sep. 2017, BANDAI NAMCO Holdings and BANDAI NAMCO Studios, press release, PAC-MAN and ARS Electronica work together to create a PAC-A-THON.

Zenji Nishikawa, "A La Carte Mobile Technology, No. 41: Experiencing 'ABAL:DINOSAUR!' Hot Topic Multiplayer VR System," Appliv Games, Sep. 1, 2017 <https://games.appliv.jp/archives/306396> [Searched on January 6, 2022].

* cited by examiner

PREDETERMINED OPERATION PERFORMED OR PREDETERMINED ITEM USED

PLAYERS ON SAME SIDE
FIRST HIGH FIVE

PLAYERS ON SAME SIDE
SECOND HIGH FIVE

FIG. 26A

A AND B HIGH FIVED!!
B CHANGED TO MAIN CHARACTER!!

FIG. 26B

CURRENT STATUS
    NUMBER OF MAIN CHARACTERS   3 PEOPLE
    NUMBER OF MONSTERS   7 PEOPLE

THERE ARE MORE MONSTERS THAN
MAIN CHARACTERS

PENALTY PROCESS

SIMULATION SYSTEM, PROCESS METHOD, AND INFORMATION STORAGE MEDIUM

Japanese Patent Application No. 2018-003809 filed on Jan. 12, 2018 is hereby incorporated by reference in its entirety.

BACKGROUND

The disclosure relates to a simulation system, a process method, an information storage medium, and the like.

Conventionally, simulation systems that generate an image as viewed from a virtual camera in a virtual space have been known. For example, by displaying the image as viewed from the virtual camera on a head mounted display (HMD), Virtual Reality (VR), Augmented Reality (AR), and/or Mixed Reality (MR) can be implemented. Japanese Patent Application Publication No. 1999-309269 discloses an example of a conventional technique of such a simulation system.

Such a simulation system enables a user to feel virtual reality by displaying an image, on an HMD, as viewed from a virtual camera set to be at a position in a virtual space corresponding to the point-of-view of the user in the real space. There has been a technique of making a character with a point-of-view set as the virtual camera appear in the virtual space, but there has been no attempt to change the types of the appearing characters. Furthermore, there has been no technique of generating a display image reflecting positional relationship between users or between a user and a disposed object in the virtual space.

BRIEF DESCRIPTION OF THE DRAWINGS

FIG. 26A and FIG. 26B are drawings for describing a notification process for a change status of positional relationship or of the change process.

DESCRIPTION OF EXEMPLARY EMBODIMENTS

Figure 1:
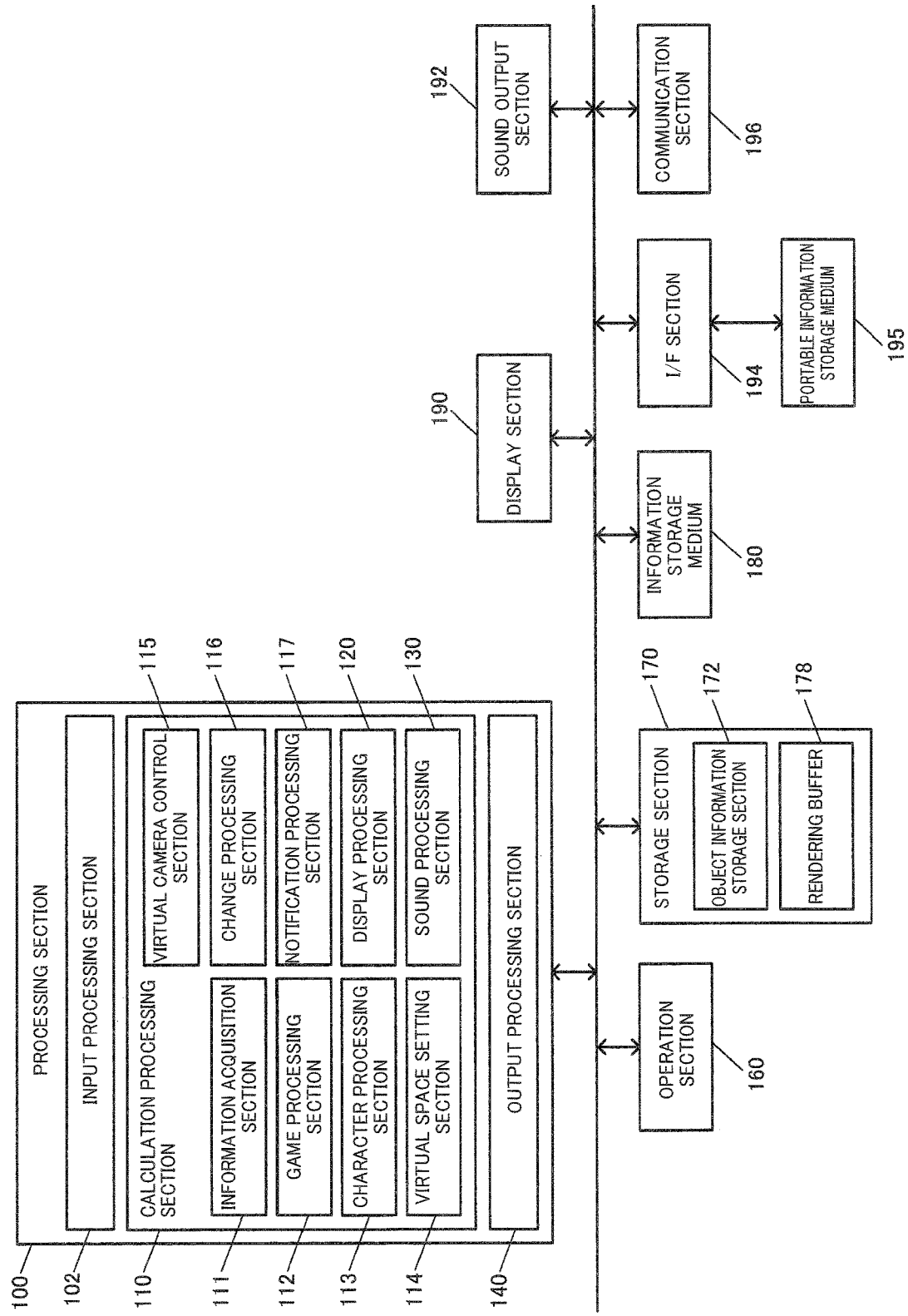
FIG. 1 is a block diagram illustrating a configuration example of a simulation system according to the present embodiment.

The following disclosure provides many different embodiments, or examples, for implementing different features of the provided subject matter. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or of coupled to each other with one or more other intervening elements in between.

In accordance with one of some embodiments, a simulation system, a process method, an information storage medium, and the like capable of generating a virtual space image reflecting the positional relationship between users or between a user and a disposed object can be provided.

In accordance with one of some embodiments, there is provided a simulation system comprising a processor including hardware, the processor being configured to perform
an information acquiring process of acquiring position information about a user moving in a real space;
a game process that is a process for a game played by the user;
a virtual space setting process of setting a virtual space;
a display process of generating, as a virtual space image, a display image in which an image of a user character corresponding to the user is displayed at a position in the virtual space corresponding to a position of the user in the real space; and a change process of changing at least one of the image of the user character corresponding to the user, an image of another user character corresponding to another user, and an image of a disposed object when a change condition is determined to be satisfied with the user and the other user in the real space or the disposed object in the virtual space being in given positional relationship.

In accordance with one of some embodiments, position information about a user moving in a real space is acquired and a process for a game played by the user is performed. A virtual space setting process of setting a virtual space is performed, and as a virtual space image, a display image in which an image of a user character corresponding to the user is displayed at a position in the virtual space corresponding to a position of the user in the real space is generated. Then, whether or not a change condition is satisfied with the user and another user in the real space or a disposed object in the virtual space being in given positional relationship is determined. When the change condition is determined to be satisfied, the image of the user character corresponding to the user, an image of another user character corresponding to the other user, and an image of the disposed object is changed. For example, the image is changed to an image of a different type of user character, another user character, or a disposed object. Thus, a simulation system and the like capable of generating a virtual space image reflecting the positional relationship between users or between a user and a disposed object can be provided.

In accordance with one of some embodiments, as the change process, the processor may perform a process of changing a display mode of the image of the user character or the image of the other user character, in accordance with operation information about the user or the other user or a status of the user or the other user regarding the game.

With this configuration, how the image of the user character and/or the other character is displayed changes when the user or the other user perform a given operation or achieve a given game status, whereby various statuses can be reflected.

In accordance with one of some embodiments, in the change process, the processor may perform a process of changing a display mode of the image of the user character or the image of the disposed object when the change condition is determined to be satisfied with the user and the disposed object being in the given positional relationship.

With this configuration, how the image of the user character and/or the disposed object is displayed changes when given positional relationship between the user and the disposed object is achieved, whereby a virtual space image reflecting the positional relationship between the user and the disposed object can be generated.

In accordance with one of some embodiments, the processor may be configured to perform the change process in accordance with a type of the user character, a type of the other user character, or a type of the disposed object.

With this configuration, a change process reflecting the type of the user character, the other character or the disposed object is performed, whereby a wide variety of content change process can be implemented.

In accordance with one of some embodiments, the processor may be configured to perform the change process in accordance with relationship information between the user and the other user, or relationship information between the user and the disposed object.

With this configuration, a change process reflecting the type of the relationship information between the user and the other user or the user and the disposed object is performed, whereby a wide variety of content change process can be implemented.

In accordance with one of some embodiments, the processor may be configured to perform the change process in accordance with a game level or a gameplay history of the user or the other user.

With this configuration, a change process reflecting a game level or gameplay history of the user or the other user is performed, whereby a wide variety of content change process can be implemented.

In accordance with one of some embodiments, in the change process, the processor may perform a game mode change process when the change condition is determined to be satisfied.

With this configuration, the game mode also changes in various ways in response to the achievement of the given positional relationship between the user and the other user or between the user and the disposed object, whereby a process for a game developing in various ways can be implemented.

In accordance with one of some embodiments, in the game process, the processor may perform a game result calculation process, and in the change process, the processor may perform, as the game mode change process, changing a calculation scheme for the game result when the change condition is satisfied.

With this configuration, the game result calculation scheme is also changed in response to the achievement of the given positional relationship between the user and the other user or between the user and the disposed object, whereby strategic and exciting aspects of the game can be increased.

In accordance with one of some embodiments, in the change process, the processor may perform, as the game mode change process, a role change process for the user or the other user in the game when the change condition is satisfied to change an image of the user character or the other user character into an image of a character corresponding to a changed role.

With this configuration, when the change condition is satisfied, the role of the user or the other user in the game is changed, and the image of the character is changed to an image corresponding to the role, whereby the role of the user and the image of the character can be changed in a linked manner.

In accordance with one of some embodiments, in the change process, the processor may perform a process of limiting the role change process.

With this configuration, the change process for the role of the user can be prevented from being performed unlimitedly, and thus the game balance can be appropriately adjusted.

In accordance with one of some embodiments, wherein
a limited time period being set for the gameplay after the
game is started,
in the change process,
the processor may perform
varying a change mode of the game mode in accordance
with a timing at which the change condition is satisfied.

With this configuration, the content of the game mode
change process is changed in a wide variety of ways in
accordance with the timing at which the change condition is
satisfied within the limited time period, whereby various
game processes can be implemented.

In accordance with one of some embodiments, wherein
a plurality of users playing in the real space being
assigned to first to M-th roles with M being an integer
equal to or larger than 2,
in the change process,
the processor may perform
the game mode change process based on percentage
information about number of users assigned to each of
the first to the M-th roles.

With this configuration, the users can be prevented from
assigned to the roles in an unbalanced manner.

In accordance with one of some embodiments,
the processor may be configured to perform
a notification process for a positional relationship status
among a plurality of users playing the game, or a
change status of the change process.

With this configuration, the change status of the positional
relationship status between users and of the change process
can be easily recognized by the users, whereby an improved
user interface can be achieved.

In accordance with one of some embodiments,
in the change process,
the processor may perform
determining that the change condition is satisfied when
the user and the other user or the disposed object are
determined to be in the given positional relationship
and the user is determined to have performed a given
action.

With this configuration, whether or not the change condition is satisfied can be determined not only based on the
positional relationship but also based on the action performed by the user.

In accordance with one of some embodiments,
in the virtual space setting process,
the processor may perform
disposing a route setting object, for setting a route in
which the user moves, in the virtual space, and
in the game process,
the processor may perform
a process for the game played by the user by moving
along the route.

With this configuration, a game can be played by moving
along the route set by the route setting object disposed in the
virtual space.

In accordance with one of some embodiments,
in the game process,
the processor may perform
a penalty process performed on the user when the user is
determined to have moved through the route setting
object or have come into contact with the route setting
object.

With this configuration, incidents where the user breaks
the rule by moving through or contacting the route setting
object to play the game advantageously can be prevented.

In accordance with one of some embodiments, there is
provided a process method comprising performing an information acquiring process of acquiring position information
about a user moving in a real space;
performing a game process that is a process for a game
played by the user;
performing a virtual space setting process of setting a
virtual space;
performing a display process of generating, as a virtual
space image, a display image in which an image of a
user character corresponding to the user is displayed at
a position in the virtual space corresponding to a
position of the user in the real space; and
performing a change process of changing at least one of
the image of the user character corresponding to the
user, an image of another user character corresponding
to another user, and an image of a disposed object when
a change condition is determined to be satisfied with
the user and the other user in the real space or the
disposed object in the virtual space being in given
positional relationship.

One of some embodiments relates to a computer-readable
information storage medium storing a program for causing
a computer to perform the above-described process method.

1. Simulation System

FIG. 1 is a block diagram illustrating a configuration
example of a simulation system (a simulator, a game system,
or an image generation system) according to the present
embodiment. The simulation system according to the present embodiment is a system that simulates Virtual Reality
(VR) for example, and can be applied to various systems
such as a game system providing game contents. The
simulation system according to the present embodiment is
not limited to the configuration illustrated in FIG. 1, and can
be modified in various ways including omitting some of its
components (sections) or adding another component.

An operation section 160 is used by a user (player) to
input various types of operation information (input information). The operation section 160 can be implemented by
various operation devices such as an operation button, a
direction designating key, a joystick, a handle, a pedal, a
lever, and a voice input device for example.

A storage section 170 stores therein various types of
information. The storage section 170 functions as a work
area for a processing section 100, a communication section
196, and the like. The storage section 170 stores therein a
game program and game data required for executing the
game program. The function of the storage section 170 can
be implemented by a semiconductor memory (dynamic
random access memory (DRAM), video RAM (VRAM)), a
hard disk drive (HDD), a solid state drive (SSD), an optical
disc device, or the like. The storage section 170 includes an
object information storage section 172 and a rendering
buffer 178.

An information storage medium 180 (computer readable
medium) stores therein a program, data, and the like. The
function of the information storage medium 180 can be
implemented by an optical disc (a digital versatile disc
(DVD), a Blu-ray disc (BD), a compact disc (CD)), an HDD,
a semiconductor memory (read only memory (ROM)), and
the like. The processing section 100 performs various processes according to the present embodiment based on a
program (data) stored in the information storage medium
180. Thus, the information storage medium 180 stores
therein a program for causing a computer (a device including the input device, the processing section, the storage
section, and an output section) to function as the sections according to the present embodiment (a program for causing a computer to perform processes of the sections).

Figure 2A:
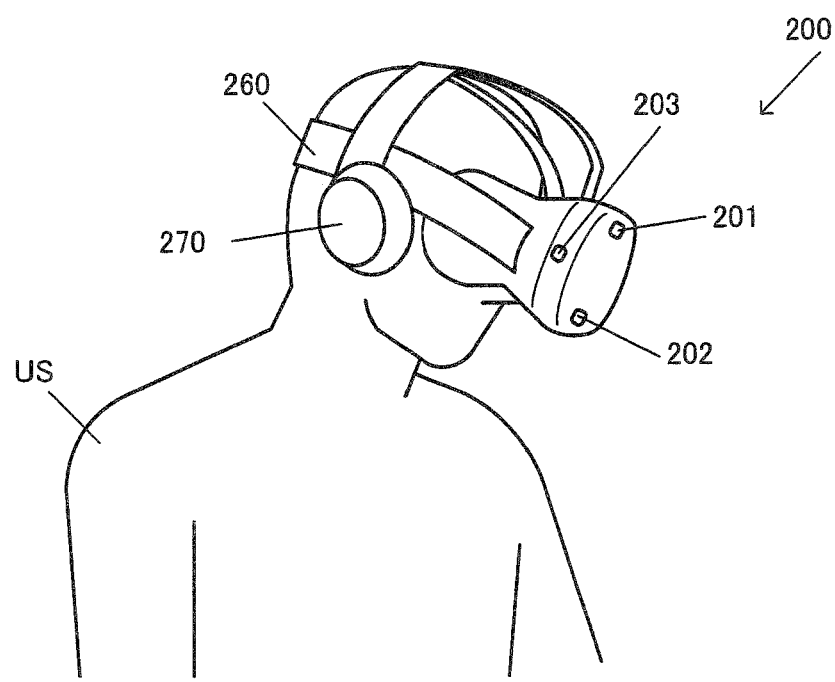
FIG. 2A and FIG. 2B are drawings illustrating examples of an HMD used in the present embodiment.

A display section 190, which outputs an image generated in accordance with the present embodiment, can be implemented by a liquid crystal display (LED), an organic electroluminescence (EL) display, a cathode ray tube (CRT), or the like. In the present embodiment, the display section 190 may be a head mounted display (HMD) 200 as illustrated in FIG. 2A to FIG. 3 described later. A sound output section 192 outputs sound generated in accordance with the present embodiment, and has a function that can be implemented by a speaker or a headphone.

An interface (I/F) section 194 performs an interface process for a portable information storage medium 195. The function of the I/F section 194 can be implemented with an application specific integrated circuit (ASIC) for the I/F process. The portable information storage medium 195 is a storage device that stores therein various types of information from the user, and holds the information without power supply. The portable information storage medium 195 can be implemented with an integrated circuit (IC) card (memory card), a universal serial bus (USB) memory, a magnetic card, or the like.

The communication section 196 communicates with external apparatuses (other devices) through a wired or wireless network. The function of the communication section 196 can be implemented with a communication ASIC, hardware such as a communication processor, or a communication firmware.

The program (data) for causing a computer to function as the sections according to the present embodiment may be distributed to the information storage medium 180 (or the storage section 170) from an information storage medium of a server (host device) through a network and the communication section 196. The scope of the present invention can include such a configuration where the information storage medium of the server (host device) is used.

The processing section 100 (processor) performs a game process (simulation process), a virtual space setting process, a character process, a virtual camera control process, a display process, or sound process based on operation information from the operation section 160, tracking information about the HMD 200 illustrated in FIG. 2A to FIG. 3 (information about at least one of the point-of-view position and the line-of-sight direction of the HMD), and a program.

Processes (functions) according to the present embodiment performed by sections of the processing section 100 can be implemented by a processor (processor including hardware). For example, the processes according to the present embodiment can be implemented by a processor that operates based on information such as a program and a memory that stores therein the information such as the program. For example, the processor may implement the functions of the sections in discrete hardware or in integrated hardware. For example, the process may include hardware and the hardware may include at least one of a circuit that processes a digital signal and a circuit that processes an analog signal. For example, the processor may include one or a plurality of circuit devices (such as an integrated circuit (IC) for example) or one or a plurality of circuit elements (such as a resistor and a capacitor for example) mounted on a circuit board. For example, the processor may be a central processing unit (CPU). However, the processor is not limited to the CPU, and various processors such as a graphics processing unit (GPU) or a digital signal processor (DSP) may be used. The processor may be a hardware circuit such as an application specific integrated circuit (ASIC). The processor may include an amplifier circuit, a filter circuit, or the like that processes an analog signal. The memory (storage section 170) may be a semiconductor memory such as a static random access memory (SRAM) and a dynamic RAM (DRAM) or may be a resistor. Furthermore, the memory may be a magnetic storage device such as a hard disk device (HDD) or may be an optical storage device such as an optical disc device. For example, the memory stores therein a computer-readable command, and the processes (functions) of the sections of the processing section 100 are implemented with the processor executing the command. This command may be a set of commands forming a program, or may be a command for instructing an operation to a hardware circuit of the processor.

The processing section 100 includes an input processing section 102, a calculation processing section 110, and an output processing section 140. The calculation processing section 110 includes an information acquisition section 111, a game processing section 112, a character processing section 113, a virtual space setting section 114, a virtual camera control section 115, a change processing section 116, a notification processing section 117, a display processing section 120, and a sound processing section 130. As described above, the processes according to the present embodiment performed by these sections may be implemented by a processor (or a processor and a memory). Various modifications may be made with some of these components (sections) omitted, or another component added.

The input processing section 102 performs an input process including: a process of receiving operation information or tracking information; a process of reading information from the storage section 170; and a process of receiving information through the communication section 196. For example, the input processing section 102 performs an input process including: a process of acquiring operation information input by a user by using the operation section 160 and tracking information detected by the HMD 200, a process of reading information, designated with a read command, from the storage section 170, and a process of receiving information from an external apparatus (such as a server) through a network. The receiving process includes a process of instructing the communication section 196 to receive information, acquiring the information received by the communication section 196, and writing the information to the storage section 170.

For example, the calculation processing section 110 performs various calculation processes For example, the calculation processes are performed for an information acquiring process, a game process (simulation process), a character process, a virtual space setting process, a virtual camera control process, a change process, a notification process, a display process, a sound process, or the like.

The information acquisition section 111 (a program module for an information acquiring process) performs an acquiring process for various types of information. For example, the information acquisition section 111 acquires position information about the user wearing the HMD 200. The information acquisition section 111 may also acquire direction information, posture information, or the like about the user.

The game processing section 112 (a program module for a game process) performs various game processes for the user to play the game. In other words, the game processing section 112 (simulation processing section) performs various simulation processes to enable the user to experience Virtual Reality (VR), Augmented Reality (AR), Mixed Reality (MR), and the like.

The character processing section 113 (a program module for a character process) performs various processes for a character (moving body in a wider sense) moving in a virtual space. For example, processes of moving the character and making the character operate in the virtual space (object space, game space) are performed. For example, the character processing section 113 performs a control process of moving a character (model object) in the virtual space or causing operation (by motion or animation) of a character, based on operation information input by the user by using the operation section 160, acquired tracking information, a program (movement/operation algorithm), various types of data (motion data), and the like. Specifically, the character processing section 113 performs a simulation process of sequentially obtaining movement information (position, rotational angle, speed, or acceleration) and operation information (a position or a rotational angle of a part object) about a character on a frame by frame basis (one frame=1/60 seconds, for example). The frame is a unit of time for the character movement/operation process (simulation process) and an image generation process. For example, the character is a moving body that moves within a virtual space in accordance with a user (player) in the real space.

The virtual space setting section 114 (a program module for a virtual space setting process) performs a setting process for a virtual space (object space) where an object is disposed. For example, a process of arranging and setting various objects (an object formed by a primitive surface such as a polygon, a free-form surface or a subdivision surface) representing various displayed objects such as a character (such as a person, a robot, a car, a train, an aircraft, a boat, a monster, or an animal), a map (terrain), a building, audience seats, a course (road), woods, a wall, and a water surface in the virtual space is performed. Specifically, a position and a rotational angle (that is the same as an orientation or a direction) of an object in a world coordinate system are determined, and the object is arranged at the position (X, Y, Z) at the rotational angle (rotational angles about X, Y, and Z axes). Thus, the object information storage section 172 of the storage section 170 stores object information in association with an object number. The object information includes information about a position, rotational angle, a movement speed, a moving direction, and the like of an object (part object) in the virtual space. Examples of the process performed by the virtual space setting section 114 include updating the object information by a frame by frame basis.

The virtual camera control section 115 (a program module for a virtual camera control process) controls a virtual camera. For example, the virtual camera is controlled by a process based on operation information and tracking information about the user input by using the operation section 160.

For example, the virtual camera control section 115 controls the virtual camera set as a first person point-of-view and a third person point-of-view of the user. For example, the virtual camera is set to be at a position corresponding to the point-of-view (first person point-of-view) of a character moving in the virtual space, and the point-of-view position and the line-of-sight direction of the virtual camera are set to control the position (positional coordinates) and the orientation (a rotational angle about a rotational axis) of the virtual camera. Alternatively, the virtual camera is set to a position of the point-of-view (third person point-of-view) for following the character and the point-of-view position and the line-of-sight direction of the virtual camera are set, whereby the position and the orientation of the virtual camera are controlled.

For example, the virtual camera control section 115 controls the virtual camera to follow the change in the point-of-view of a user based on tracking information about the point-of-view information about the user acquired by the point-of-view tracking. For example, in the present embodiment, tracking information (point-of-view tracking information) about point-of-view information that is at least one of the point-of-view position and the line-of-sight direction about the user is acquired. For example, the tracking information can be acquired by performing a tracking process for the HMD 200. The virtual camera control section 115 changes the point-of-view position/line-of-sight direction of the virtual camera based on the acquired tracking information (information that is about at least one of the point-of-view position and the line-of-sight direction of the user). For example, the virtual camera control section 115 sets the virtual camera so that the point-of-view position/line-of-sight direction (position/orientation) of the virtual camera in the virtual space changes in accordance with the change in the point-of-view position/line-of-sight direction of the user in the real space. Thus, the virtual camera can be controlled to follow the change in the point-of-view of the user, based on the tracking information about the point-of-view information of the user.

The change processing section 116 (a program module for a change process) performs various change processes for an image of a character and a game mode. The notification processing section 117 (a program module for a notification process) performs various notification processes. Examples of the notification process include a warning to the user. For example, the notification process may be performed by using an image and sound, or may be performed by using a vibration device or a sensation device utilizing sound, an air cannon, or the like.

The display processing section 120 (a program module for a display process) performs a display process for a game image (simulation image). For example, a rendering process is performed based on results of various processes (a game process, a simulation process) performed by the processing section 100 to generate an image, and the image is displayed on the display section 190. Specifically, a geometry process such as coordinate transformation (world coordinate transformation, camera coordinate transformation), a clipping process, a perspective transformation, or a light source process is performed. Rendering data (coordinates of the vertex position of the primitive surface, texture coordinates, color data, a normal vector, an a value, or the like) is generated based on a result of the process. An object (one or a plurality of primitive surfaces) after the perspective transformation (after the geometry process) is rendered in the rendering buffer 178 (a frame buffer, a work buffer or the like that can store image information in a unit of pixels), based on the rendering data (primitive surface data). Thus, an image as viewed from the virtual camera (a given point-of-view, a left-eye, right-eye, first, or second point-of-view) in the virtual space is generated. The rendering process performed by the display processing section 120 can be implemented with a vertex shader process, a pixel shader process, or the like.

The sound processing section 130 (a program module for sound process) performs a sound process based on a result of various processes performed by the processing section 100. Specifically, game sound such as a song (music, background music (BGM)), a sound effect, or a voice is generated to be output by the sound output section 192.

The output processing section 140 performs an output process of outputting various types of information. For example, the output processing section 140 performs the output process including: a process of writing information to the storage section 170; and a process of transmitting information through the communication section 196. For example, the output processing section 140 performs a process of writing information, designated by a write command, to the storage section 170, and a process of transmitting information to an external apparatus (such as a server) through a network. This transmission process is a process of instructing the communication section 196 to transmit information, and a process of designating the information to be transmitted to the communication section 196.

The simulation system according to the present embodiment includes the information acquisition section 111, the game processing section 112, the virtual space setting section 114, the change processing section 116, and the display processing section 120, as illustrated in FIG. 1.

The information acquisition section 111 acquires position information about the user. For example, when the user is positioned in a play field (a simulation field or a play area) in a real space (real world), the position information about the user in the play field is acquired. Specifically, the information acquisition section 111 acquires the position information about the user in the real space based on point-of-view tracking information. The point-of-view tracking information can be acquired by performing the tracking process for the HMD 200 for example. For example, the information acquisition section 111 acquires position information on the HMD 200 as the position information about the user wearing the HMD 200. For example, the tracking information may include at least one of change information (a value of change in the coordinates of the point-of-view position) about the point-of-view position from the initial point-of-view position of the user and change information (a value of change in the rotational angle about the rotation axis of the line-of-sight direction) of the line-of-sight direction from the initial line-of-sight direction of the user. Based on change information about the point-of-view information in such tracking information, the point-of-view position corresponding to the position of the user and the line-of-sight direction corresponding to a direction of the user can be identified. The position information about the user may be acquired by a process of directly tracking the user or a body part of the user such as his or her head, instead of the tracking process for the HMD 200. The information acquisition section 111 may acquire the direction information and the posture information about the user. For example, based on the tracking information acquired by a point-of-view tracking process, direction information corresponding to a direction the user is facing in the real space is acquired. The information acquisition section 111 acquires posture information that is motion information about the user. The posture information is information for identifying a movement of the user's body part such as hand, head, or foot. For example, the information acquisition section 111 acquires the posture information about the user through a process known as Kinect (registered trademark). The position information acquired by the information acquisition section 111 may be relative position information between users. For example, position information about a first user may be a relative position information based on a position of a second user. Similarly, the direction information acquired by the information acquisition section 111 may be relative direction information between users.

The game processing section 112 performs a process for a game played by the user. Examples of the game process include a process of starting the game when a game start condition is satisfied, a process of making the started game progress, a process of ending the game when a game end condition is satisfied, and a process of calculating a game result. For example, the game processing section 112 performs a game process for a plurality of users in a play field of the real space to play a game, that is, a process of a multiplayer game.

The virtual space setting section 114 performs a virtual space setting process. For example, a process of setting how an object serving as a user character corresponding to the user, an object serving as another user character corresponding to another user, and an object forming a map or a background are disposed in the virtual space is performed. The user character is a character that moves in the virtual space in accordance with a movement of the user in the real space. The other user character is a character that moves in the virtual space in accordance with a movement of the other user in the real space. For example, motions of the user character and the other user character are respectively linked to motions of the user and the other user in the real space.

The display processing section 120 (image generation section) generates a virtual space image as an image to be displayed on the display section 190. Specifically, the display processing section 120 generates a virtual space image as a display image in which an image of the user character corresponding to the user is displayed at a position in the virtual space corresponding to the position of the user in the real space. Similarly, a virtual space image is generated as a display image in which an image of the other user character corresponding to the other user is displayed at a position in the virtual space corresponding to the position of the other user in the real space. For example, the information acquisition section 111 acquires the position information about the user and about the other user in the real space. This position information may be relative position information between users. The virtual space setting section 114 disposes the user character and the other user character at positions in the virtual space corresponding to the positions of the user and the other user in the real space, based on the acquired position information. An image as viewed from the virtual camera in this virtual space is generated as the virtual space image to be displayed on the display section 190.

Examples of the virtual space image include VR, AR and MR images. For example, the VR image is an image generated in such a manner that a VR space entirely covers the field of view of the user wearing the HMD 200. The AR image is an image displayed to be overlapped with a display object forming a scenery and the like of the real space. The MR image is an image generated by an MR technique of mixing the real space and the virtual space into a new space featuring realtime interaction between real and virtual elements. The MR is a concept covering any augmented reality and augmented virtuality. The display processing section 120 generates an image of the virtual space as viewed from the virtual camera (given point-of-view), as a display image of the HMD 200. For example, rendering process is performed for an image as viewed from the virtual camera set to the point-of-view (first person point-of-view) of the character (user character, the other user character). Alternatively, a rendering process is performed for an image as viewed from the virtual camera set to the point-of-view (third person point-of-view) that follows the character. For example, the image generated is preferably a stereoscopic image such as a left-eye image and a right-eye image.

The change processing section 116 performs a change process of changing at least one of the user character image corresponding to the user, the other user character image corresponding to the other user character, and an image of the disposed object, when a change condition is determined to have been satisfied. Specifically, the user character image corresponding to the user, the other user character image corresponding to the other user character, or the image of the disposed object is changed when the change condition is determined to have been satisfied with given positional relationship between the user and the other user in the real space or the disposed object in the virtual space achieved. For example, the user character image or the other user character image is changed when the change condition is satisfied with given positional relationship between the user and the other user achieved. The user character image or the image of the disposed object is changed when the change condition is satisfied with given positional relationship between the user and the disposed object achieved.

The change process performed when the change condition is satisfied is a process of changing the image of the user character or the other user character into an image of a different type of character. Alternatively, the process is performed for changing the image of the disposed object into an image of a different type of disposed object. The change process may be an image change process of erasing the user character or the other user character. The change process may be a process of changing a game mode described later. Changing to the different type of character or disposed object includes changing to a character or a disposed object an image of which has a main part different from that of the original, or changing to a character or a disposed object with a different role in the game. For example, the disposed object is an object forming an object of an item disposed in the virtual space or an object forming a map.

For example, the given positional relationship in the change condition is positional relationship corresponding to close to each other or in contact with each other. For example, the given positional relationship is achieved when a distance between the user and the other user or the disposed object is equal to or smaller than a given distance, or when the other user or the disposed object is positioned within a given distance range set to the user. The position of the disposed object in this positional relationship may be a position of the disposed object in the real space corresponding to that in the virtual space. The change condition may be satisfied when the given positional relationship between the user and the other user or the disposed object is satisfied, or may be satisfied when the positional relationship is achieved and another condition is satisfied. For example, the change processing section 116 may determine whether the change condition is satisfied, based on whether or not the positional relationship is satisfied and whether or not the user has made a given action.

The positional relationship between the user and the other user or the disposed object may be determined based on absolute coordinates (world coordinates) in the virtual space or may be determined based on relative coordinates. For example, the positional relationship may be determined based on the absolute coordinates of the user in the virtual space and the absolute coordinates of the other user or the disposed object in the virtual space. Alternatively, the positional relationship may be determined based on relative coordinates of the other user or the disposed object with reference to the position of the user. For example, relative coordinates of the other user or the disposed object may be obtained by using a camera, (an RGB camera, a depth camera, or the like) of the HMD 200 with reference to the position of the user. Based on the relative coordinates, whether or not the given positional relationship is achieved may be determined or the image of the other user character or the disposed object may be displayed at the position of the relative coordinates.

The change processing section 116 performs a process of changing the display mode of an image of the user character or the other user character in accordance with the operation information about the user or the other user or the status of the game. The operation information is information acquired when the user or the other user operates the operation section 160. The game status includes a status of actions of a character such as the user character or the other character, the status of the environment of the character (the status of the map in which the character moves, the status of the periphery of the character, or the status of time information such as a time point), and the status of the progress of the game. In the change process for the display mode of the character image, for example, the image is changed without changing the main part of the character. For example, image properties such as semitransparency, color, texture, or brightness is changed without changing the basic outer appearance of the character. Alternatively, in the change process for the display mode of the character image, a process of partially changing the character, or making the character possess an object such as a weapon, protection, or an item may be performed.

The change processing section 116 performs a process of changing the display mode of an image of the user character or the disposed object when the change condition is determined to have been satisfied with given positional relationship between the user and the disposed object satisfied. For example, when the user is in the proximity of the disposed object or performs a given action while being in the proximity of the disposed object, the change condition is determined to have been satisfied. For example, the given action is an action of touching, holding up, or checking the content of the disposed object. When the change condition is satisfied, the display mode of the user character image or the disposed object image is changed. In the change process for the display mode of the user character or the disposed object image, for example, the image is changed without changing the main part of the user character or the disposed object image. For example, image properties such as semitransparency, color, texture, or brightness is changed without changing the basic outer appearance of the user character or the disposed object image. Alternatively, a process of partially changing the user character, or making the user character possess an object such as a weapon, protection, or an item may be performed.

The change processing section 116 performs a change process in accordance with the type of the user character, the type of the other user character, or the type of the disposed object. For example, the content of the change process, performed when the change condition is satisfied, changes in accordance with these types. For example, the change processing section 116 performs a change process for a first content when the character such as the user character or the other user character is of a first type, and a change process for a second content when the character such as the user character or the other user character is of a second type. The change processing section 116 performs a change process for a third content when the disposed object is of the first type, and performs a change process for a fourth content when the disposed object is of the second type. The type of a character or a disposed object is a role or an attribute of the character or the disposed object in the game. For example, image information about the character or the disposed object is classified into types to be stored in the object information storage section 172. The change process is the change process for the character or disposed object image, or is a change process for a game mode performed when the change condition is satisfied. When the change condition is satisfied, the change processing section 116 performs the change process associated in advance with the type of the character UI the disposed object.

The change processing section 116 performs a change process in accordance with the relationship information between the user and the other user or in accordance with the relationship information between the user and the disposed object. For example, the content of the change process performed when the change condition is satisfied, is changed in accordance with such relationship information. For example, the change processing section 116 performs a change process for the first content when the user character and the other user character are in first relationship, and performs a change process for the second content when the user character and the other user character are in second relationship. The change processing section 116 performs a change process for the third content when the user character and the disposed object are in the first relationship, and performs a change process for the fourth content when the user character and the disposed object are in the second relationship. The relationship between the user and the other user includes the user and the other user being on the same side or on the opposing sides, being in the same group or in different groups, being assigned to characters of the same role or attribute, or being assigned to characters of different roles or attributes. The relationship between the user and the disposed object includes whether or not the user and the disposed object is in relationship determined in advance, whether or not the user and the disposed object is in relationship to be in the same attribute, group, or role, and the like. The change process is a change process for the character or disposed object image or is a change process for a game mode, performed when the change condition is satisfied.

The change processing section 116 performs a change process in accordance with the game level or the gameplay history of the user or the other user. For example, the content of the change process performed when the change condition is satisfied is changed in accordance with the game level or the gameplay history. The game level is an index of a skill level of the gameplay or a progress level of the gameplay of each user. The gameplay history is a history of a past gameplay status or game result of each user. Data about the game level and data about the gameplay history are stored in the storage section 170 as user information associated with each user. The change processing section 116 performs the change process of the first content when the game level of each user is low, and performs change process of the second content when the game level of each user is high. Alternatively, the change process of the third content is performed when the gameplay history of each user is the first gameplay history, and the change process of the fourth content is performed when the gameplay history of each user is the second gameplay history. The change process, performed when the change condition is performed, is a change process for the character or disposed object image or a change process for the game mode. For example, the change processing section 116 changes the character or disposed object image or the game mode with a first change mode when the game level of each user is low, and changes the character or disposed object image or the game mode with a second change mode when the game level of each user is high. Alternatively, the change processing section 116 changes the change mode indicating how the character or disposed object image is changed or how the game mode is changed when the change condition is satisfied, in accordance with the past gameplay history of each user.

The change processing section 116 performs the change process of the game mode when the change condition is determined to be satisfied. The game mode is a condition of the gameplay, and is various modes for the game process. For example, the change process for the game mode includes a change process for a calculation scheme for the game result, a change process for a role of the character or the disposed object in the game, a change process for a game progress, and a change process for a game clear or end condition. For example, a change process is performed for a rule of the game in the game process. For example, when the change process for the game mode is performed, a game parameter used for the game process (game progress process) is changed, and the game process is performed based on the changed parameter.

For example, the game processing section 112 performs a calculation process for the game result. The calculation process for the game result includes a calculation process for points and scores acquired by the user in the game, and a process of determining win or lose. The change processing section 116 changes the calculation scheme (algorithm for the calculation process) for the game result, as the change process for the game mode, when the change condition is satisfied. For example, the calculation process for points and scores acquired by the user in the game, and the process of determining win or lose may be performed with the first calculation scheme before the change condition is satisfied. In such a case, when the change condition is satisfied, the calculation process for points and scores acquired by the user in the game, and the process of determining win or lose is performed with a second calculation scheme different from the first calculation scheme.

The change processing section 116 performs a change process for the role of the user or the other user in the game, as the game mode change process, when the change condition is satisfied. The image of the user character or the other user character is changed to an image of a character corresponding to the changed role. For example, the user or the other user may be playing the game in a first role before the change condition is satisfied. In such a case, the image of the user character or the other user character corresponding to the first role is displayed at the position in the virtual space corresponding to the position of the user or the other user in the real space. Then, when the change condition is satisfied, the role of the user or the other user in the game is changed from the first role to a second role. Thus, the image of the user character or the other user character corresponding to the second role is displayed at the position in the virtual space corresponding to the position of the user or the other user in the real space.

The change processing section 116 performs a limiting process for the role change process. For example, when a given limiting condition is determined to be satisfied, the change process for the user' role is restricted or the content of the role change process is changed. For example, the change processing section 116 determines that the limiting condition is satisfied when percentage of the user of the second role (percentage of the number of persons) exceeds a given threshold value. The change processing section 116 restricts the change from the first role to the second role, also when the change condition is satisfied for the user of the first role. Alternatively, the content of the role change process is changed by performing a process such as changing the first role to a third role different from the second role.

When a limited time period of the gameplay from the game start is set, the change processing section 116 changes the change mode indicating how the game mode is changed, in accordance with the timing at which the change condition is satisfied. For example, the game processing section 112 sets a limited time period of the gameplay, and when the limited time period has expired after the game starts, determines that a game end condition is satisfied and performs a game end process. The change processing section 116 performs a first change process as the game mode change process when the change condition is satisfied at a first timing within the limited time period. A second change process with a content different from that of the first change process is performed as the game mode change process when the change condition is satisfied at a second timing. For example, the change processing section 116 changes the game result calculation scheme from the first calculation scheme to the second calculation scheme when the change condition is satisfied at the first timing, and changes the game result calculation scheme from the first calculation scheme to the third calculation scheme when the change condition is satisfied at the second timing. The change processing section 116 changes the role of the character or the disposed object under the first change mode when the change condition is satisfied at the first timing, and changes the role of the character or the disposed object under the second change mode when the change condition is satisfied at the second timing.

When a plurality of users playing in the real space are assigned to first to M-th roles (M is an integer equal to or larger than 2), the change processing section 116 performs the game mode change process based on percentage information about the number of users assigned to each of the first to the M-th roles. For example, the number of users assigned to the first role may decrease to be smaller than the number of users assigned to the second role. In such a case, the change processing section 116 changes the value of a game parameter such as an ability parameter of the user character corresponding to the first role to a value advantageous for the user of the user character. Alternatively, the change processing section 116 changes the value of a game parameter such as an ability parameter of the user character corresponding to the second role to a value disadvantageous for the user of the user character. Thus, the change processing section 116 performs an adjustment process for a game balance in accordance with the role percentage information.

The notification processing section 117 performs a notification process for a change status of the positional relationship among a plurality of users playing the game, or of the change process. For example, a first user and a second user may be in given positional relationship such as proximal relationship and contact relationship. In such a case, the notification processing section 117 notifies each of the first user and the second user of information indicating that they are in such positional relationship, using an image, sound, or the like. The notification processing section 117 notifies each of the users of a change status of the image of the character or the disposed object or of the game mode, due to satisfaction of the change condition, using an image, sound, or the like. For example, the notification processing section 117 performs the notification process by using a screen of a User Interface (UI) displayed to overlap with the display image of the HMD 200.

The change processing section 116 determines that the change condition is satisfied when the user and the other user or the disposed object are determined to be in the given positional relationship and the user is determined to have performed a given action. Then, the change processing section 116 performs the change process for the image of the character or the disposed object, or the change process for the game mode. Thus, the change processing section 116 does not determine that the change condition is satisfied only when the given positional relationship such as proximal relationship and the contact relationship between the user and the other user or the disposed object is satisfied, and determines that the change condition is satisfied when the user performs a predetermined given action in addition to the achievement of the relationship. For example, the change processing section 116 determines whether or not the user has performed the given action based on posture information or operation information about the user acquired by the information acquisition section 111. For example, the change condition is determined to be satisfied, when a user takes a given posture (for example, a high five posture described later) or the user performs a given operation on the operation section 160, after the given positional relationship is achieved between the user and the other user or the disposed object. For example, when the operation section 160 is a controller in a shape of a gun, the change processing section 116 determines that the change condition is satisfied when the user performs a gun-firing operation using the controller.

The virtual space setting section 114 disposes a route setting object, for setting a route in which the user moves, in the virtual space. For example, the route setting object is disposed on the play field in the virtual space. For example, the route setting object is an object forming a map in the virtual space (play field) to define the route in which the user moves. For example, the route setting object is an object for limiting the user's movement route to a given route. The game processing section 112 performs a process for a game played by the user by moving along the route. For example, the game process is performed for a game that progresses as the user moves along a route (course and the like) set by the route setting object. For example, the game processing section 112 performs a game process so that the user can obtain a game point or score by moving along the route.

The game processing section 112 performs a penalty process on a user when the user is determined to have moved through or have come in contact with the route setting object. For example, the penalty process on a user is performed when the user's body is determined to have partially or entirely (virtually) crossed the route setting object. Alternatively, the penalty process on a user is performed when the user's body is determined to have (virtually) come into contact with the route setting object. The penalty process is a process of making a disadvantageous impact on the gameplay by the user. For example, the penalty process is a process of subtracting the game point or score obtained by the user, or lowering an increasing rate of the point or the score obtained. Alternatively, the penalty process is used to apply a disadvantageous modifier, when determining if the user won or lost.

In the present embodiment, a virtual reality simulation process is performed as a game process for the game played by the user. The virtual reality simulation process is a simulation process simulating an event in the real space in the virtual space, and is for enabling the user to virtually experience the event. For example, the virtual reality simulation process is a process for making the character (user moving body) corresponding to the user in the real space move in the virtual space, and enabling the user to feel the change in the environment or periphery due to the movement.

A process performed by the simulation system according to the present embodiment illustrated in FIG. 1 can be implemented by a processing apparatus such as a personal computer (PC) installed in a facility, a processing apparatus (PC) worn by the user, or by processes performed by these processing apparatuses in cooperation. Alternatively, the process performed by the simulation system according to the present embodiment may be implemented by a server system and a terminal device. For example, the process may be implemented as a process performed by the server system and the terminal device in cooperation.

2. Tracking Process

Next, an example of a tracking process will be described. FIG. 2A illustrates an example of the HMD 200 used in the present embodiment. As illustrated in FIG. 2A, the HMD 200 is provided with a plurality of light receiving elements (photodiodes) 201, 202, and 203. The light receiving elements 201 and 202 are provided on the front surface side of the HMD 200, whereas the light receiving element 203 is provided on the right side surface of the HMD 200. Note that unillustrated light receiving elements are further provided on the left side surface, the upper surface, or the like of the HMD. The HMD 200 is provided with headphone terminals for connecting with a headband 260 used for wearing rue HMD 200 or with a headphone 270.

A user US may wear an unillustrated processing apparatus (a backpack PC) on his/her back for example. For example, the user US wears a jacket with a back surface side to which the processing apparatus is attached. For example, the processing apparatus may be implemented with an information processing apparatus such as a note PC. The processes according to the present embodiment may be implemented by using such a processing apparatus worn by the user, or by using a processing apparatus for management installed in the facility. Alternatively, the processes according to the present embodiment may be implemented by processes performed by the processing apparatus worn by the user and the processing apparatus for management in cooperation.

Figure 4:
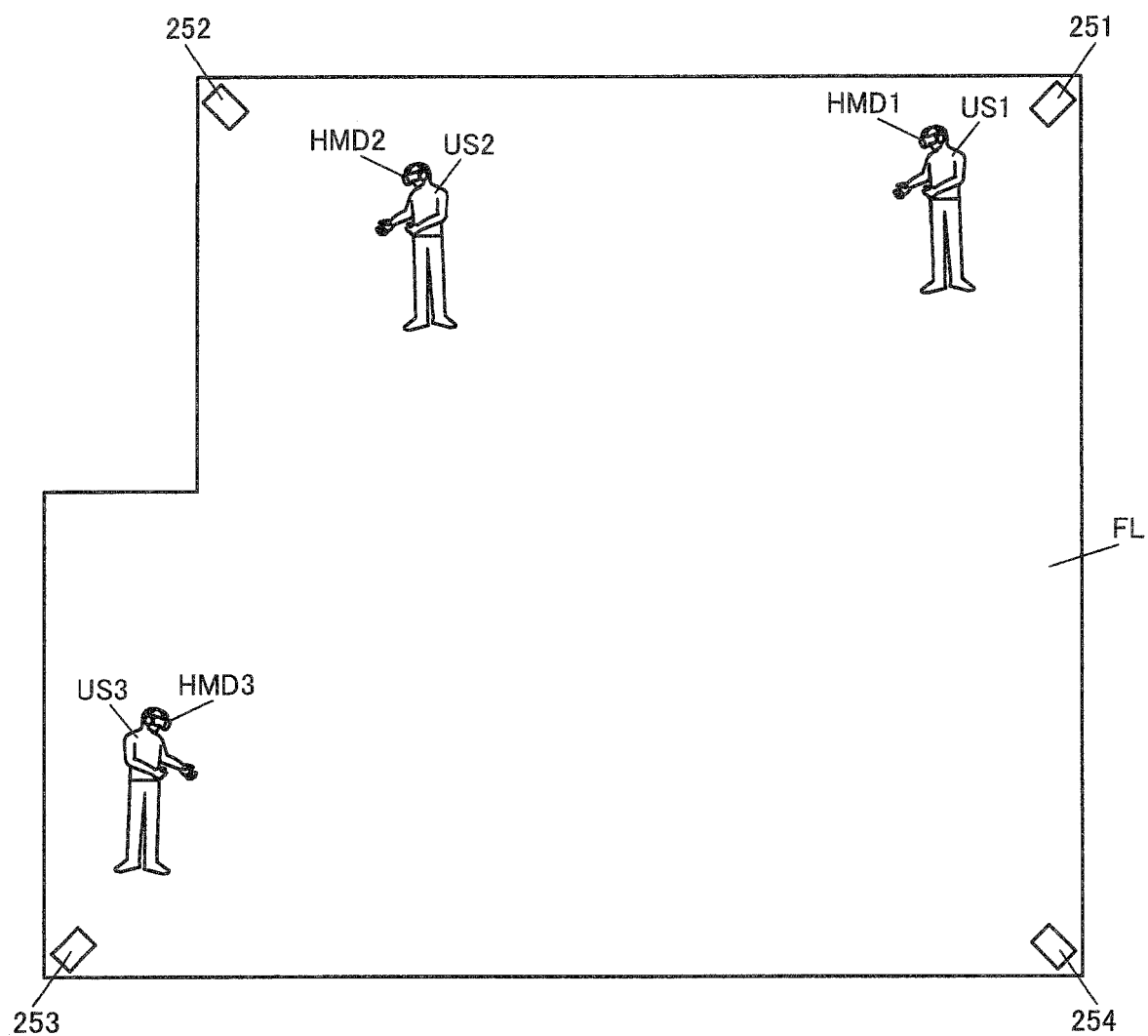
FIG. 4 is a drawing illustrating an example of a play field in a real space.

As illustrated in FIG. 4, devices 251, 252, 253, and 254 for measuring the position information and the like are disposed in a play field FL in the real space. The number of the measurement devices 251 to 254 is not particularly limited. When the HMD 200 illustrated in FIG. 2A is used, the measurement devices 251 to 254 are provided with light emitting elements. For example, the light emitting elements are implemented with LEDs that emit laser beams (such as infrared laser beams). The measurement devices 251 to 254 radially emit laser beams by using the light emitting elements for example. The light receiving elements 201, 202, and 203 provided to the HMD 200 illustrated in FIG. 2A receive the laser beams from the light emitting elements so that the tracking for the HMD 200 is implemented, whereby the position and the facing direction of the head of the user US (the point-of-view position or the line-of-sight direction) can be detected. Thus, the position information and the direction information about the user can be acquired.

Figure 2B:
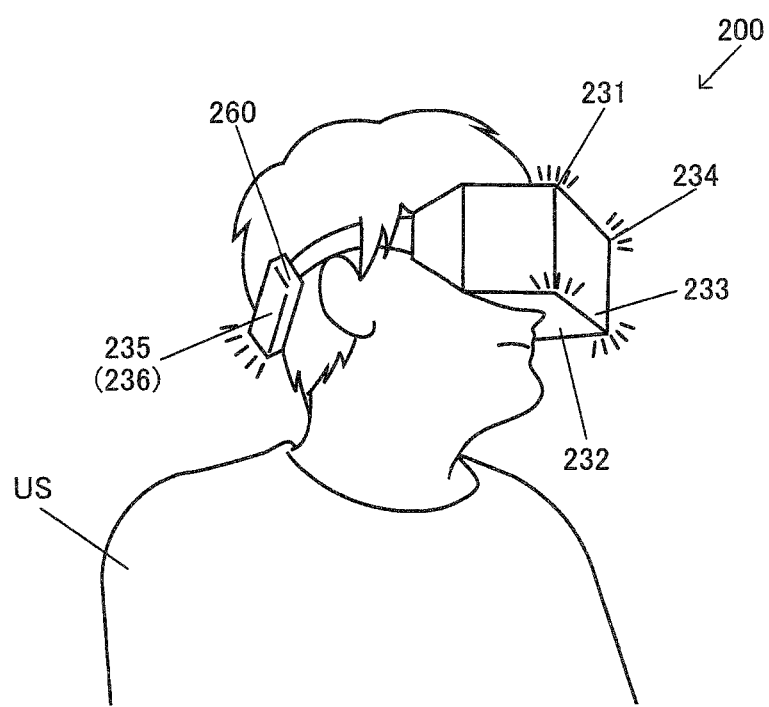
Figure 3:
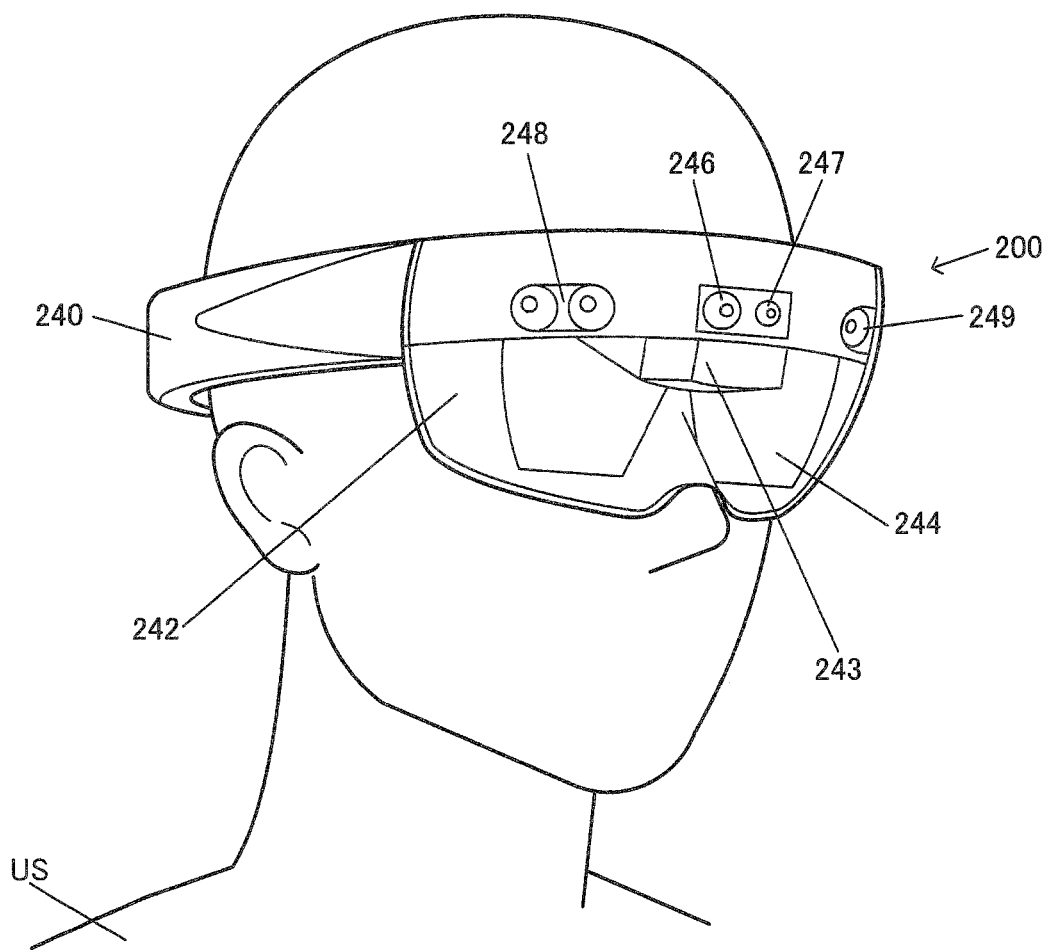
FIG. 3 is a drawing illustrating an example of an HMD used in the present embodiment.

FIG. 2B illustrates another example of the HMD 200 used in the present embodiment. The HMD 200 illustrated in FIG. 2B is provided with a plurality of light emitting elements 231 to 236. For example, these light emitting elements 231 to 236 are implemented with LEDs or the like. The light emitting elements 231 to 234 are provided on the front surface side of the HMD 200, and the light emitting element 235 and the light emitting element 236 (not illustrated) are provided on the back surface side. These light emitting elements 231 to 236 emit light in a wavelength band of visible light (light emission) for example. Specifically, the light emitting elements 231 to 236 emit light of colors different from each other.

When the HMD 200 illustrated in FIG. 2B is used, the measurement devices 251 to 254 illustrated in FIG. 4 are provided with image capturing sections capturing images based on the light from the light emitting elements 231 to 236 of the HMD 200. Thus, the captured image obtained by the image capturing section includes spots of the light from the light emitting elements 231 to 236. The head (HMD) of the user US is tracked with image processing executed on the captured image, Thus, the position and the facing direction of the head of the user US (the point-of-view position and the line-of-sight direction) are detected. Thus, the position information and the direction information about the user US can be acquired. For example, the image capturing section is provided with first and second cameras. The position of the head of the user US in a depth direction and the like can be detected by using first and second captured images respectively captured by the first and the second cameras. A rotational angle (line-of-sight) of the head of the user US can be detected based on measurement information from an inertia measurement unit (an acceleration sensor, a gyro sensor) provided to the HMD 200. Thus, with such an HMD 200, the HMD 200 can display an image (an image as viewed from the virtual camera corresponding to the point-of-view of the user) of the virtual space (virtual three-dimensional space) corresponding to the direction in which the user US is facing regardless of which of all 360 degrees directions he or she is facing.

For example, the display section of the HMD 200 illustrated in FIG. 2A and FIG. 2B can be implemented with an organic electroluminescence display (OEL) or a liquid crystal display (LCD). For example, the display section of the HMD 200 is provided with a first display or a first display area set to be in front of the left eye of the user, and a second display or a second display area set to be in front of the right eye of the user, whereby stereoscopic display can be provided. When the stereoscopic display is provided, for example, a left-eye image and a right-eye image of different parallaxes are generated to be respectively displayed on the first and the second displays. Alternatively, the left-eye image and the right-eye image are respectively displayed on the first and the second display areas of a single display. The HMD 200 is provided with two eyepieces (fish-eye lenses) for the left-eye and the right-eye so that a VR space can be provided entirely over the field of view of the user. A correction process is performed for the left-eye image and the right-eye image to correct distortion produced in an optical system such as the eyepiece.

FIG. 3 illustrates another example of the HMD 200 used in the present embodiment. The HMD 200 illustrated in FIGS. 2A and 2B is a non-transparent type HMD, whereas the HMD illustrated in FIG. 3 is of a transparent type in a form of an eyewear. With the non-transparent type HMD 200 illustrated in FIGS. 2A and 2B, a VR image can be displayed, whereas with the transparent type HMD 200 illustrated in FIG. 3, an AR or MR image can be displayed.

The HMD 200 illustrated in FIG. 3 includes a temple part 240 and a goggle part 242. The temple part 240 incorporates a speaker. The goggle part 242 is provided with a display device 243 and a holographic optical element 244. The display device 243 is provided with a display unit including a micro display, a mirror, and a prism. The display device 243 is provided with a display unit for the left eye and a display unit for the right eye, whereby stereoscopic vision is provided. The display units for the left eye and the right eye can each be provided with a pair of micro displays, so that the position of a virtual image can be variable.

Display light from the display device 243 is refracted in a light guiding plate of the holographic optical element 244 to be guided to be in front of the eyes of the user US. Then, the display light is refracted by the holographic optical element 244 to be in a direction toward the eyeball, and thus is transmitted to the eyeball. As a result, a virtual image (a holographic reproduced image) is viewed in front of the eyes. The light guiding plate of the holographic optical element 244 is also referred to as a combiner. With this combiner that is a half mirror, an actual image of the outside world is viewed with a virtual image overlapped thereon, whereby AR and MR is implemented.

The goggle part 242 is provided with an RGB camera 246, a depth camera 247, and environment recognition cameras 248 and 249. By using the RGB camera 246, an image in the front direction of the user US can be captured. By using the depth camera 247, depth information in the front direction can be acquired. The goggle part 242 is provided with an emitter (not illustrated) for the depth camera. By using the environment recognition cameras 248 and 249, environment recognition around the user US can be implemented. The goggle part 242 incorporates an inertia measurement unit (IMU) including an acceleration sensor and a gyro sensor. The position and the facing direction of the head of the user US are detected based on images captured by a camera provided to the goggle part 242, the measurement information from the inertia measurement unit, and the like, whereby the head tracking is implemented. Furthermore, the position information and the direction information of the user US can be acquired. With a process using the RGB camera 246, the depth camera 247, and the like, the position information (relative position information), the direction information (relative direction information), or the posture information of the other user in the periphery of the user US can be acquired. For example, these pieces of information are acquired by using a process known as Kinect (registered trademark). For example, by acquiring the posture information, what king of action the other user has performed can be detected. Alternatively, the measurement devices 251 to 254 illustrated in FIG. 4 may be provided with a Kinect detection device. With such a detection device, the position information, the direction information, or the posture information (gesture) of the user US can be acquired.

The tracking process for acquiring the position information, the direction information, and the like of the user is not limited to the process described with reference to FIG. 2A to FIG. 4, and can be modified in various ways. For example, the tracking process may be implemented by the HMD 200 alone. For example, the tracking process may be implemented without providing the measurement devices 251 to 254 as illustrated in FIG. 4. Alternatively, various point-of-view tracking processes such as known eye tracking, face tracking, or head tracking can be employed.

The HMD 200 may be of a type known as a smartphone VR or VR goggle. The HMD 200 of this type is used with a smartphone contained in the goggle part of the HMD 200 to have the display section facing the eyes of the user. The left-eye eyepiece and the right-eye eyepiece are incorporated to be on the inner side of the goggle part (VR goggle). The user can see a VR stereoscopic image by seeing the left-eye image and the right-eye image displayed on the display section of the smartphone respectively through the left-eye eyepiece and the right-eye eyepiece. The tracking process of identifying the point-of-view position and the line-of-sight direction of the user can be implemented based on the inertia measurement unit (an acceleration sensor, a gyro sensor) incorporated in the smartphone and the like.

3. Method According to the Present Embodiment

Next, a method according to the present embodiment will be described in detail. The following description given mainly based on an example where the method according to the present embodiment is applied to an action game where a main character and a monster appear. The method according to the present embodiment can be applied to various games (a virtual experience game, a battle game, a racing game, a roll playing game (RPG), a sport game, a thriller experience game, a simulation game for rides such as trains and aircrafts, a puzzle game, a communication game, or a music game) and to something other than games.

3.1 Description on Game

First of all, a game implemented by the present embodiment will be described. As illustrated in FIG. 4, the play field FL, where gameplay takes place, is provided in the real space. In FIG. 4, a plurality of users US1, US2, and US3 are engaged in the gameplay in the play field FL. The users US1, US2, and US3 are respectively wearing an HMD1, an HMD2, and an HMD3. The HMD1, the HMD2, and the HMD3 may be of various types described with reference to FIG. 2A to FIG. 3. The play field FL is provided with the measurement devices 251 to 254 for obtaining position information or the like of the users US1, US2, and US3.

Figure 5:
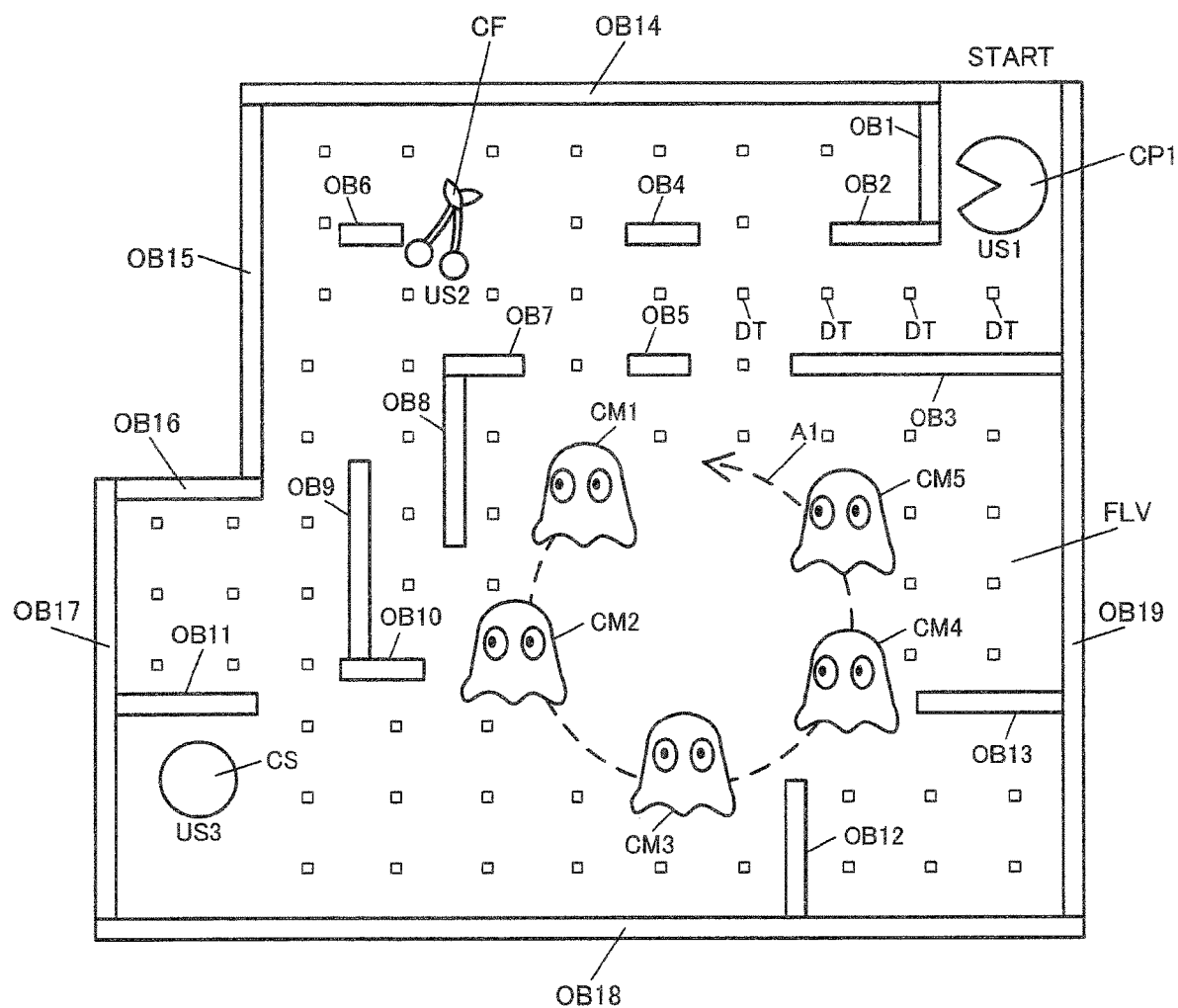
FIG. 5 is a drawing illustrating an example of a play field in a virtual space.

FIG. 5 illustrates an example of a virtual play field FLV set to the virtual space. The play field FLV in the virtual space as illustrated in FIG. 5 is set in accordance with the play field FL in the real space as illustrated in FIG. 4. The play field FLV in the virtual space is provided with route setting objects OB1 to OB19. With the route setting objects OB1 to OB19, a route in which the users (US1 to US3) move in the virtual space is set. Thus, the users move along the route without coming into contact with or moving through the objects OB1 to OB19 in the virtual space. Note that the real space in FIG. 4 has no object corresponding to the route setting objects OB1 to OB13. On the other hand, the real space in FIG. 4 has objects corresponding to the objects OB14 to OB19. In other words, the objects OB14 to OB19 corresponding to the walls of the room of the real space are disposed in the virtual space.

Thus, the user can actually move through the objects OB1 to OB13 with no corresponding objects in the real space. In view of this, a penalty process is prepared for preventing such a move through as described later. On the other hand, the objects OB14 to OB19 correspond to the walls in the real space, whereby user might bump into the wall. Thus, a notification process is performed to give warning, indicating that there is a wall ahead, to the user that has come close to the objects OB14 to OB19. For example, the warning notification process is performed with an image, sound, vibration, or the like.

In FIG. 5, the game is started after the users US1, US2, and US3 in FIG. 4 are each assigned to any one of roles including a main character CP1, a food character CF, and a special food character CS. Thus, objects of the main character CP1, the food character CF, and the special food character CS are disposed at the position of the virtual space corresponding to the positions of the users US1, US2, and US3 in the real space, and the images of these objects are displayed as display images. The main character CP1 is a character known in the name of Packman (registered trademark). The food character CF and the special food character CS are characters respectively corresponding to cherry and a power pellet. In what is known as a monster's nest denoted by A1 in FIG. 5, monsters CM1 to CM5 are moving in a circulating manner.

At the time of game start, only the user US1 is assigned to the role of the main character CP1 to perform an action of eating dots DT (cookies) as food, while moving on the play field FLV. Through this action, the user US1 can obtain the points (scores). Furthermore, the user can obtain a bonus point by contacting the food character CF or can change the monsters (CM1 to CM5) into weaker monsters by contacting the special food character CS.

Figure 6A:
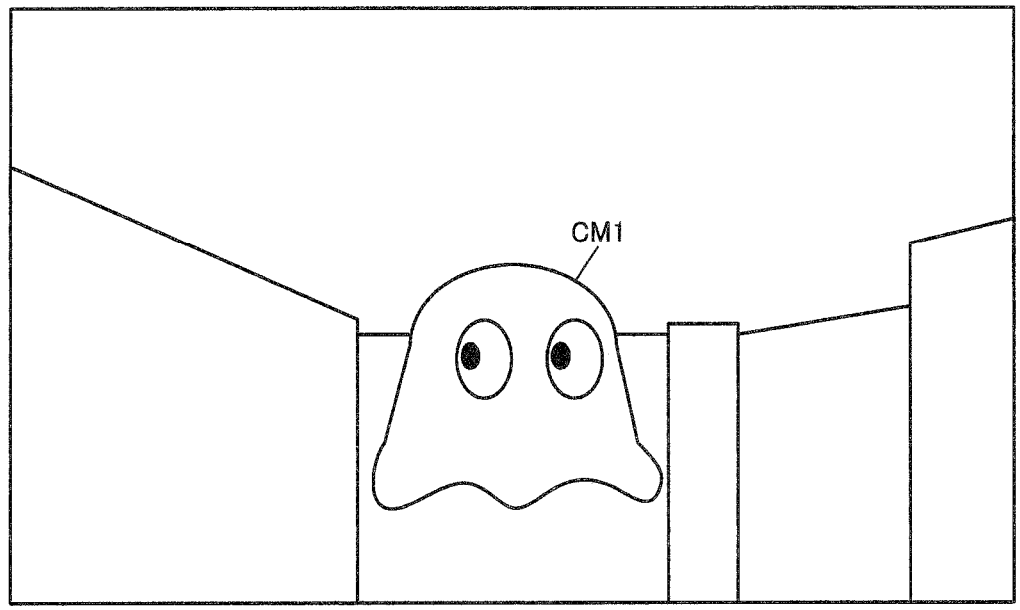
FIG. 6A and FIG. 6B are drawings illustrating examples of display images generated in the present embodiment.
Figure 6B:
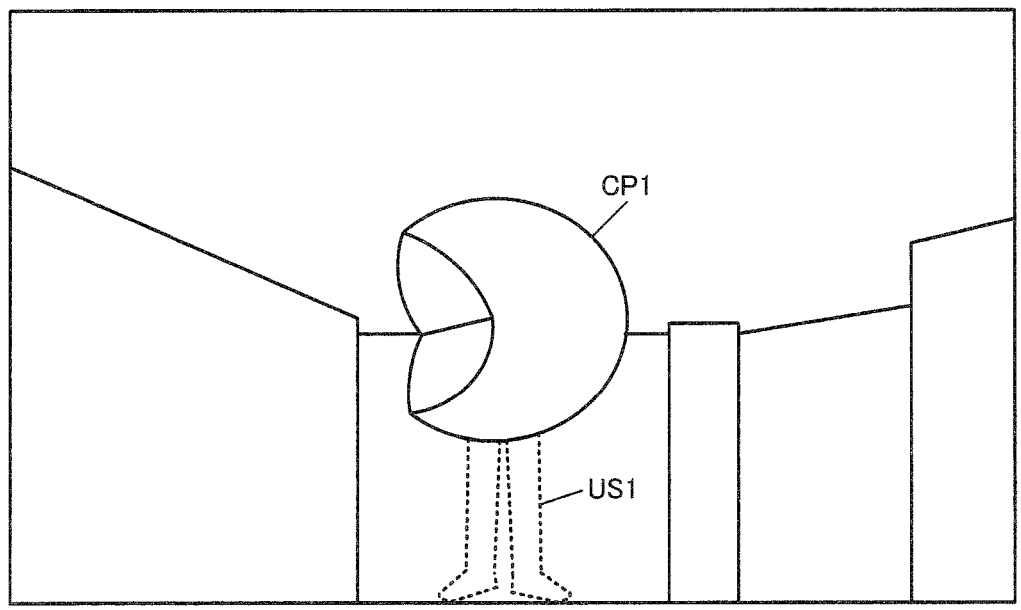
Figure 7:
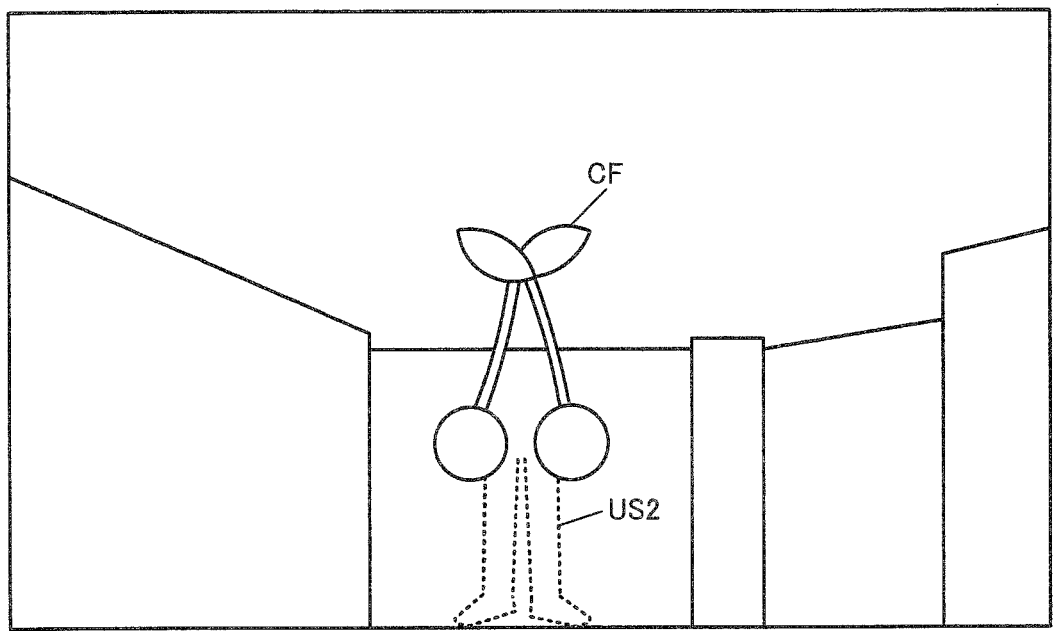
FIG. 7 is a drawing illustrating an example of display images generated in the present embodiment.

FIG. 5 illustrates a schematic two-dimensional image for simplifying the description. However, three-dimensional object images as illustrated in FIG. 6A, FIG. 6B, and FIG. 7 are actually displayed on the HMDs (HMD1 to HMD3) of the users (US1 to US3). For example, FIG. 6A illustrates a display image in a case where the monster CM1 appears in front of the user. FIG. 6B illustrates a display image of the user US1 playing the game in the role of the main character CP1, as viewed from the users US2 and US3. For example, when the HMD 200 for AR or MR as illustrated in FIG. 3 is used, the user US1 in the real space can also be seen in the fields of view of the other users US2 and US3. FIG. 7 illustrates a display image of the user US2 playing the game in the role of the food character CF, as viewed from the users US1 and US3. For example, when the HMD 200 for AR or MR as illustrated in FIG. 3 is used, the user US2 in the real space can also be seen in the fields of view of the users US1 and US3. In such a case, for example, a marker (such as a QR marker) is attached to each user, and image recognition is performed with images of the markers captured with the RGB camera 246 illustrated in FIG. 3. Thus, the character images of the main character CP1, the food character CF, and the like as illustrated in FIG. 6B and FIG. 7 may be displayed.

Figure 8A:
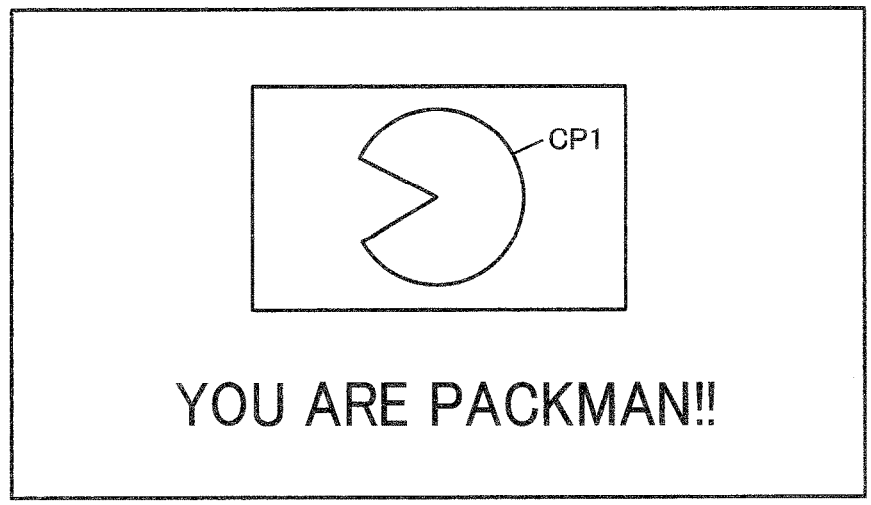
FIG. 8A to FIG. 8C are drawings illustrating examples of a UI screen that notifies a user of his/her role.
Figure 8B:
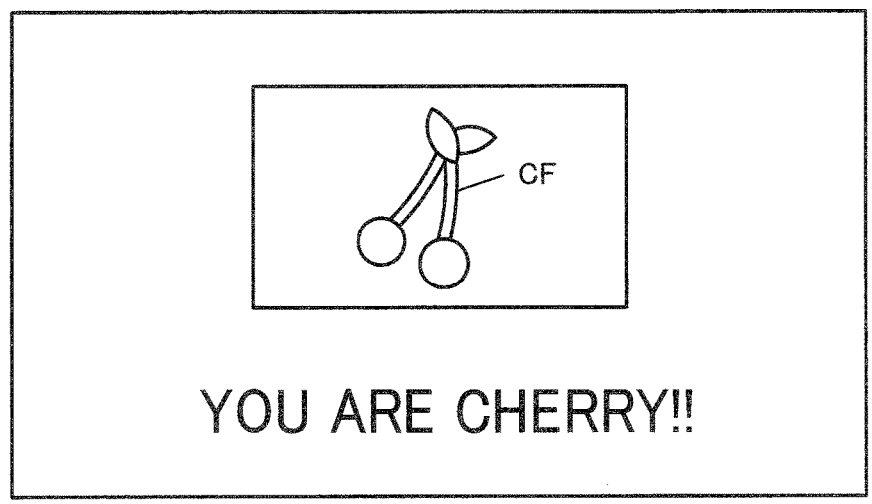
Figure 8C:
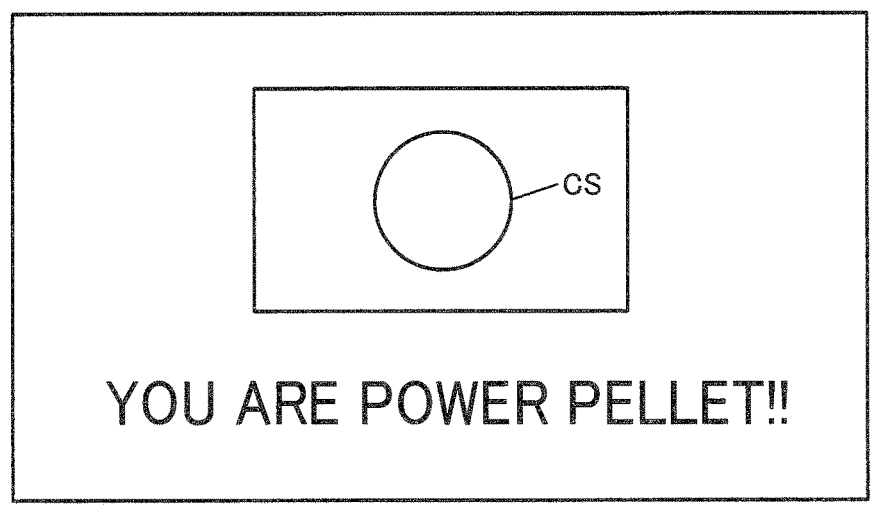

The role of each user in the game is displayed on the HMD of the user with a UI screen as illustrated in each of FIG. 8A to FIG. 8C. For example, the UI screen as illustrated in each of FIG. 8A to FIG. 8C is displayed when each user looked down on his or her feet during the game. In the example illustrated in FIG. 5, the UI screen illustrated in FIG. 8A is displayed on the HMD (MHD1) of the user US1 to notify the user of his or her role as the main character CP1. The HMDs (HMD2 and HMD3) of the users US2 and US3 respectively display the UI screens illustrated in FIG. 8B and FIG. 8C, and thus the users are notified of their roles as the food character CF and the special food character CS.

Figure 9A:
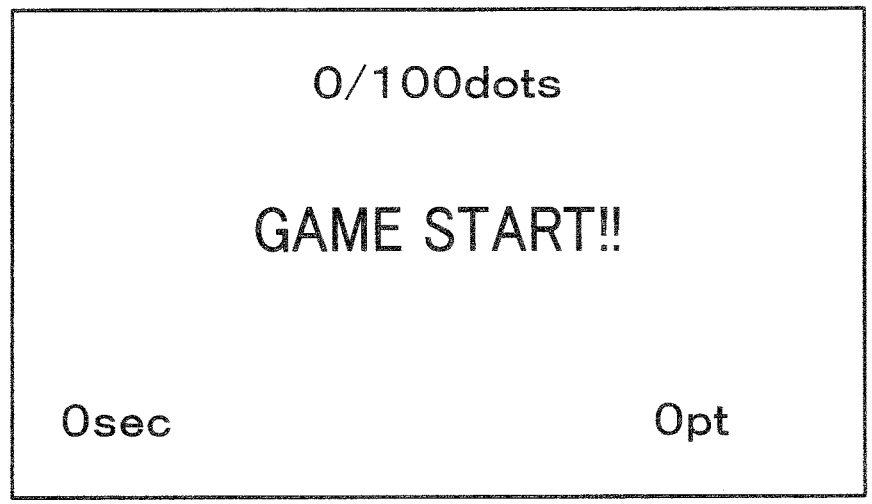
FIG. 9A to FIG. 9C are drawings illustrating examples of a UI screen displayed as a game progresses.
Figure 9B:
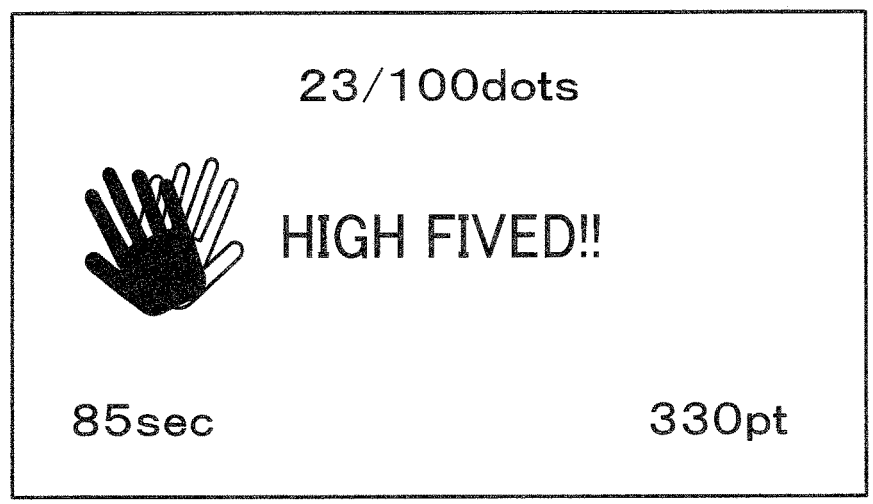
Figure 9C:
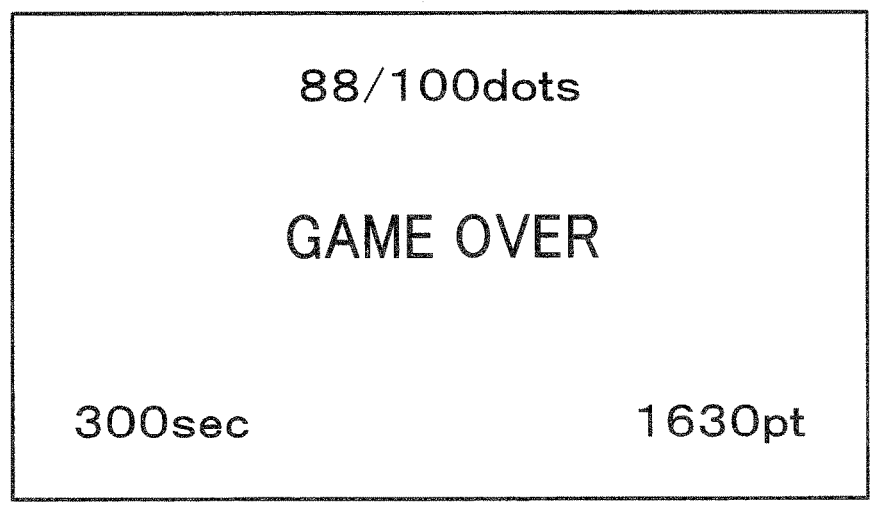

FIG. 9A, FIG. 9B, and FIG. 9C illustrate examples of UI screens displayed as the game progresses. In the present embodiment, an exemplary limited time period of 300 seconds is set for the gameplay, and elapsed time within the limited time period is displayed on the UI screen. The number of obtained dots indicating the number of dots eaten, the total number of dots, and the points obtained by the user by eating the dot are displayed on the UI screen. At the time of game start illustrated in FIG. 9A, the obtained number of dots, out of the total number of dots which is 100, is 0 and thus, the obtained point is also 0 points.

Figure 10:
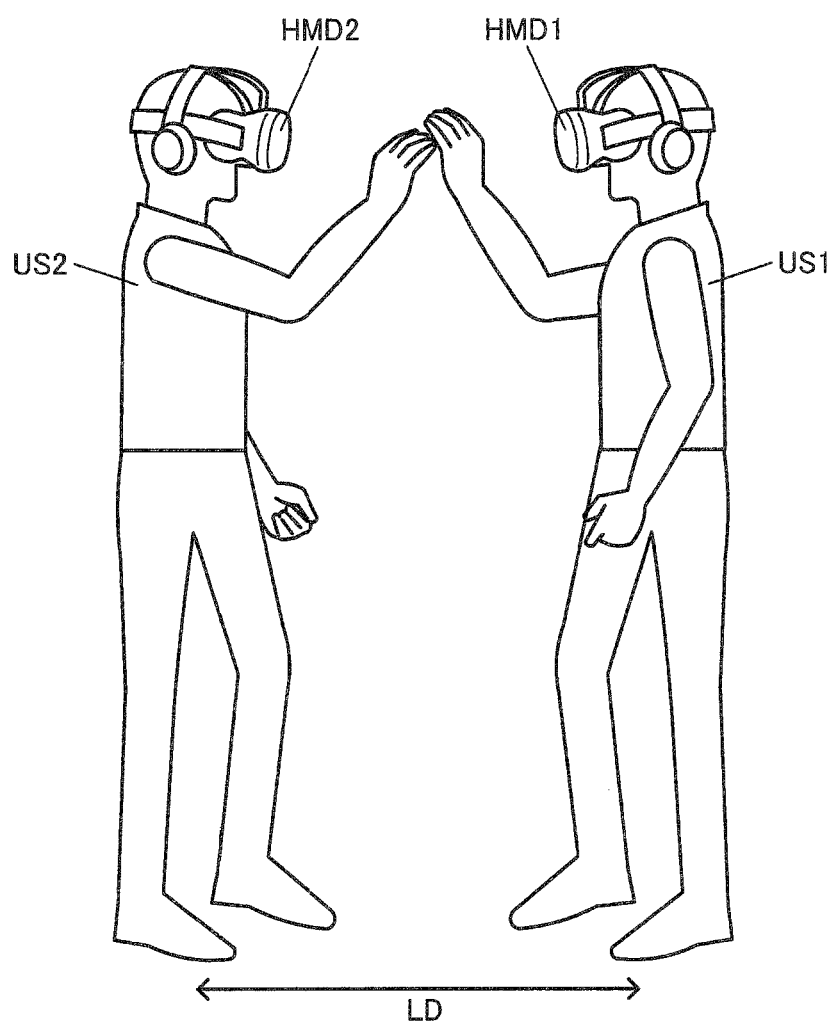
FIG. 10 is a drawing for describing a process of determining a change condition with users being in given positional relationship.

When the proximal positional relationship (the given positional relationship in a wider sense) is achieved with a distance LD between the users US1 and US2 being short, and a high five action (a given action in a wider sense) is performed as illustrated in FIG. 10, the change condition to change the image of the character or the like is satisfied. In such a case, a UI screen notifying that the high five was successfully performed is displayed as illustrated in FIG. 9B. Thus, in the present embodiment, a notification process for a change status of the positional relationship among a plurality of users and of the change process is performed. The screen illustrated in FIG. 9B further includes notification information that the elapsed time within the limited time period is 85 second, the number of obtained dots is 23, and the obtained point is 330 points. For example, the points increase as the player obtains dots or comes into contact with the food character and/or the special food character.

FIG. 9C illustrates a UI screen displayed at the time of game end. The screen illustrated in FIG. 9C further includes notification information that the 300 second limited time period has been reached, the number of obtained dots is 88, and the obtained point is 1630 points. In the present embodiment, the users US1, US2, and US3 in FIG. 4 enjoy multiplayer game, by all turning into the main character to cooperate in achieving a goal of obtaining all the dots in the play field FLV. Thus, all the users participating are each assigned to a role, and cooperate to achieve the goal. The users can enjoy mutual communications through actions such as high five as illustrated in FIG. 10. As described later, users starting game as the food character and the special food character can turn into the main character by high flying the user as the main character. Then, the users can cooperate to enjoy the game of obtaining the dots and defeating the monsters.

3.2 Change Process for Character Image and Game Mode

In the present embodiment, a process is performed for a game played by the user, by acquiring the position information about the user moving in the real space (the information about the user in a wider sense). Then, the virtual space setting process is performed, and the virtual space image (such as a VR, AR, or MR image) is generated as the display image in which the image of the user character corresponding to the user is displayed at the position of the virtual space corresponding to the position of the user in the real space. For example, the generated display image has the image of the main character CP1 as the user character corresponding to the user US1 is displayed as illustrated in FIG. 5 at the position in the virtual space corresponding to the position of the user US1 in the real space in FIG. 4. Thus, the virtual space image with the main character CP1 in the virtual space displayed as illustrated in FIG. 6B is generated. Similarly, the generated display image has the images of the food character CF and the special food character CS as the user characters corresponding to the users US2 and US3 are displayed as illustrated in FIG. 5 at the positions in the virtual space corresponding to the positions of the users US2 and US3 in the real space in FIG. 4. Thus, the virtual space image as illustrated in FIG. 7 in which the food character CF and the like in the virtual space are displayed is generated.

Then, in the present embodiment, the process of changing the image of the user character, the image of the other user character, or the image of the disposed object is performed when the change condition is determined to be satisfied with the given positional relationship between the user and the other user in the real space or the disposed object in the virtual space achieved.

For example, the character images of the users US1, US2, and US3 in the real space in FIG. 4 are images of the main character CP1, the food character CF, and the special food character CS in FIG. 5. The image of the user character is hereinafter simply referred to as a character image. The character images are displayed at positions in the virtual space corresponding to the positions of the users US1, US2, and US3 in the real space.

Figure 11:
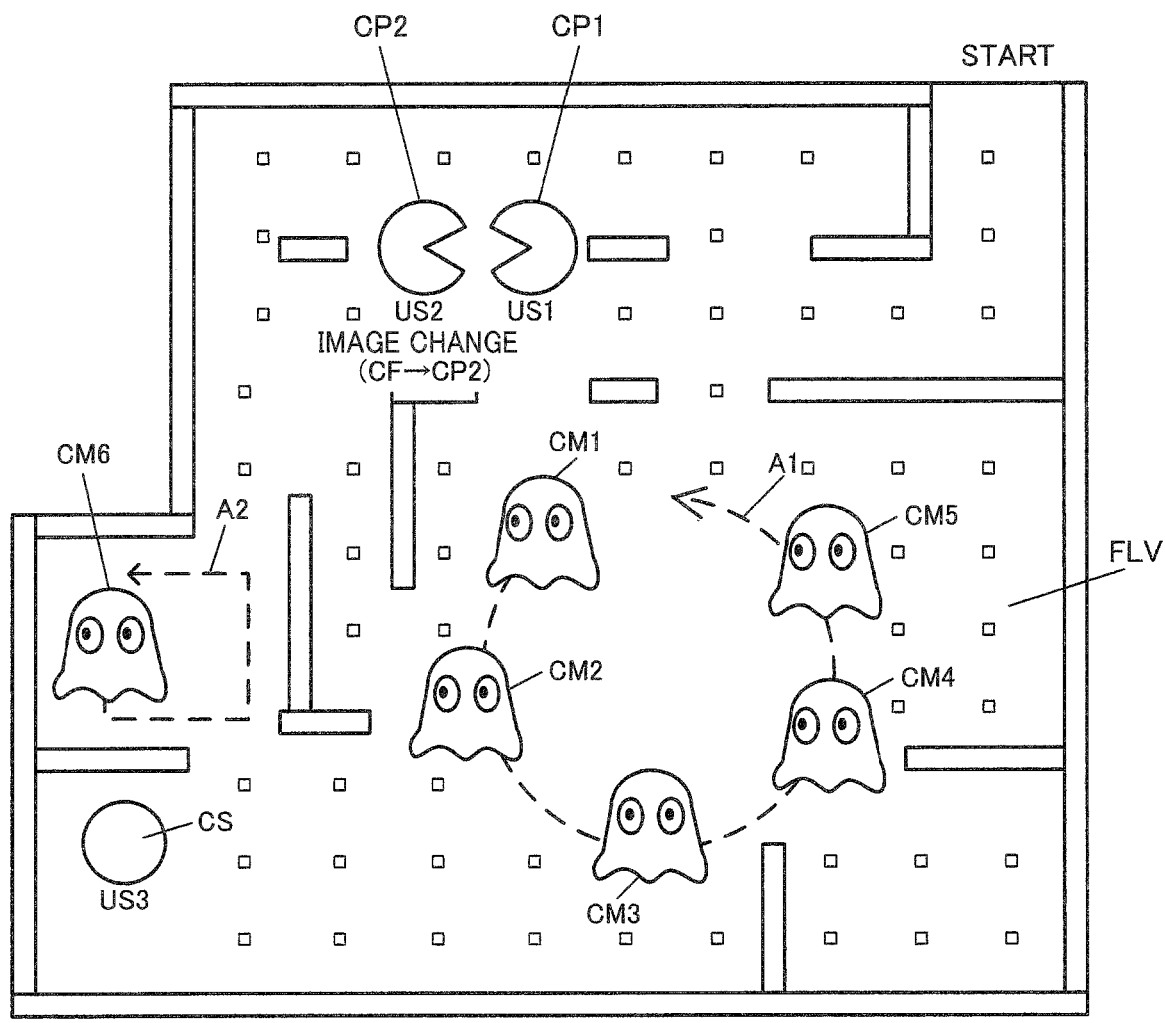
FIG. 11 is a drawing for describing a game implemented by the present embodiment.

Then, the change condition may be satisfied with the user US1 moving so that the users US1 and US2 achieve proximal positional relationship (given positional relationship) as illustrated in FIG. 10. Specifically, for example, the change condition is satisfied when the users US1 and US2 in the proximal positional relationship perform high five (given action). As a result, as illustrated in FIG. 11, the character image (user character image) of the user US2 is changed from the image of the food character CF to an image of a main character CP2. Thus, the image is changed into the image of the main character CP2 that is a type of character different from the food character CF. The game mode (gameplay condition) is also changed so that the role of the user US2 is changed from the role as the food character CF to the role as the main character CP2. For example, the food character CF can move on the play field FLV in the virtual space, but cannot obtain dots, be defeated by a monster, or defeat a weakened monster. On the other hand, the main character CP2 can move on the play field FLV in the virtual space to obtain the dots, to be defeated by a normal monster encountered, and to defeat a weakened monster. Whether or not the change condition is satisfied with the users US1 and US2 being in the given relationship such as proximal positional relationship can be determined by using the depth camera 247 and the RGB camera 246 of the HMD 200 illustrated in FIG. 3, and the like.

Figure 13A:
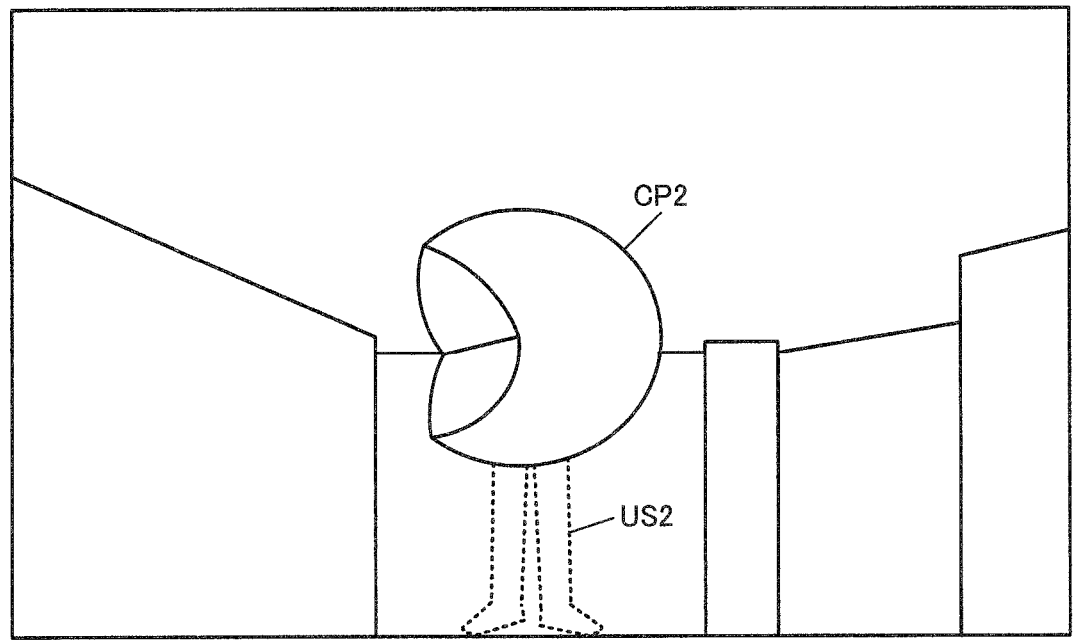
FIG. 13A and FIG. 13B are drawings illustrating examples of display images generated in the present embodiment.

As described above, in the present embodiment, when the change condition is satisfied with the users US1 and US2 being in the proximal positional relationship, the character image of the user US2 is changed from the image of the food character CF to the image of the main character CP2. For example, before the change condition is satisfied, the image of the food character CF is displayed as the character image of the user US2 as illustrated in FIG. 7. Then, when the change condition is satisfied, the image of the main character CP2 is displayed as the character image of the user US2 as illustrated in FIG. 13A. Thus, the simulation system capable of generating a virtual space image reflecting the positional relationship between users can be provided. For example, with the contact between users in the real space (real world) reflected on the virtual space by VR, AR, and/or MR, a novel game featuring fusion between the real space and the virtual space (game space) can be provided.

In the present embodiment, when the change condition is satisfied as illustrated in FIG. 10 and FIG. 11, the change process for the game mode, such as changing the role of the user US2, is performed, whereby the gameplay condition of the user US2 is changed. Thus, the game thereafter progresses under a different gameplay condition (game rule), and thus a game of a novel type can be implemented.

When the change condition is satisfied by the contact between the users US1 and US2 described above, a new monster CM6 appears as illustrated in FIG. 11 to perform a circulating movement as indicated by A2. Thus, the new monster CM6 appeared joins the circulating movement that has been going on with the monsters CM1 to CM5 in the monster's nest as indicated by A1. In other words, the increase of the number of main characters from 1 to 2 involves the increase in the number of monsters making the circulating movement, so that the game balance is adjusted.

Figure 12:
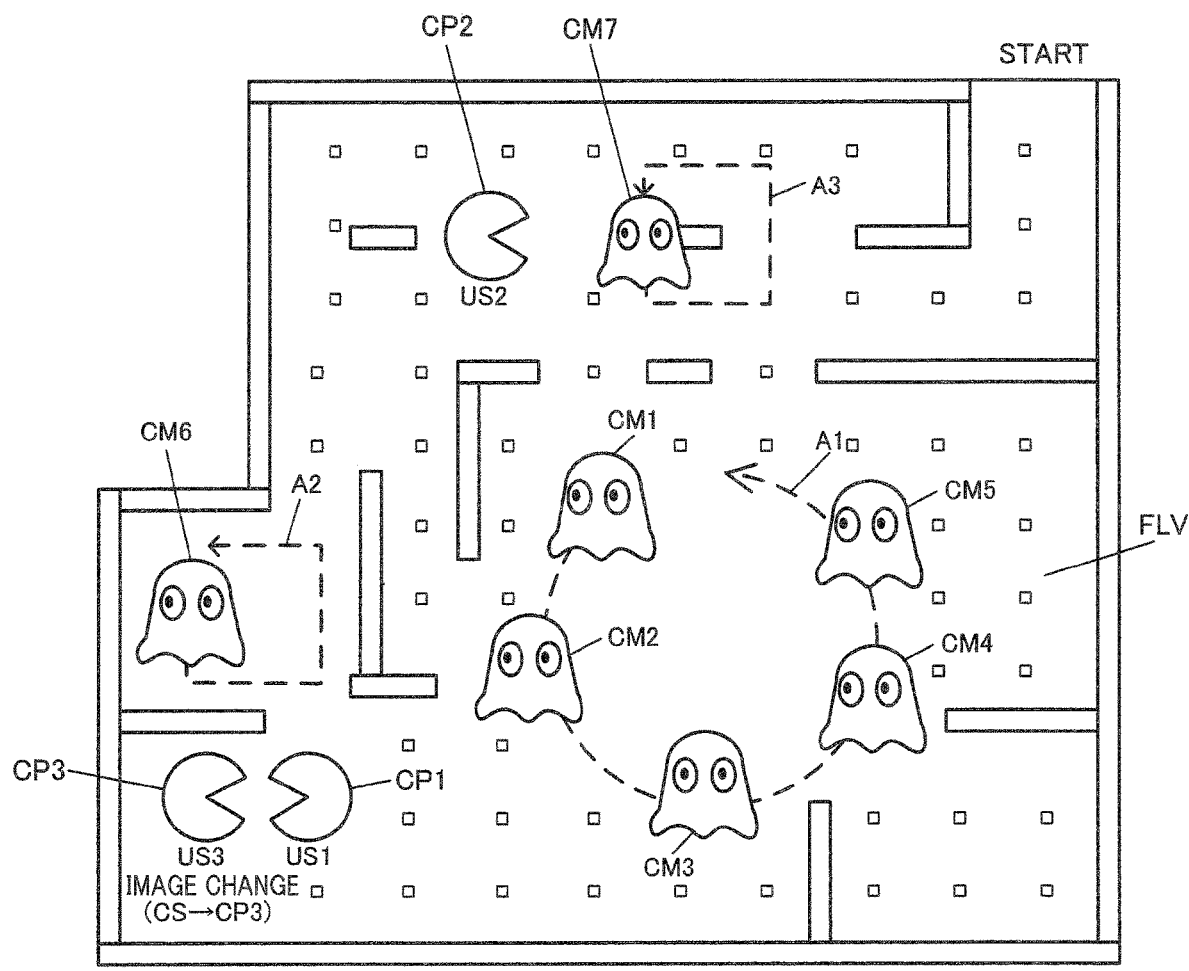
FIG. 12 is a drawing for describing a game implemented by the present embodiment.

In FIG. 12, the change condition is satisfied with the user US2 moving toward the user US3 to be in the proximal positional relationship and performing the high five as in FIG. 10. Thus, the character image of the user US3 is changed from the image of the special food character CS to the image of the main character CP3. Thus, the image is changed to the image of the main character CP3 that is a character of a type different from the special food character CS. Furthermore, the game mode is also changed so that the role of the user US3 is changed from the role as the special food character CS to the role as the main character CP3. For example, the special food character CS can move on the play field FLV in the virtual space, but cannot obtain dots, be defeated by a monster, or defeat a weakened monster. On the other hand, the main character CP3 can move on the play field FLV in the virtual space to obtain the dots, to be defeated by a normal monster encountered, and to defeat a weakened monster.

Figure 13B:
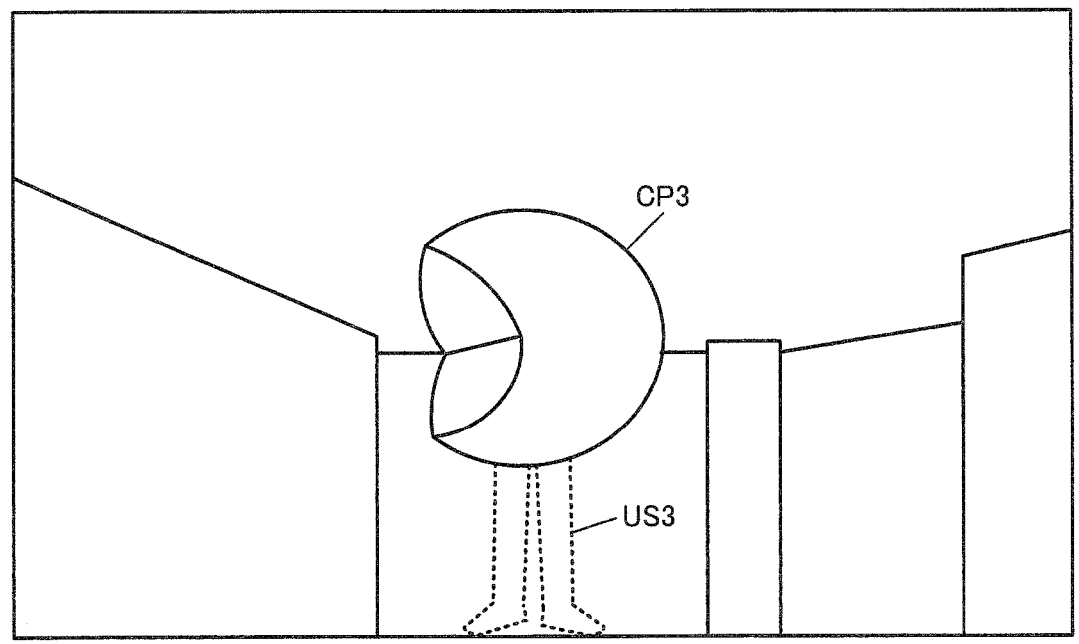

As described above, in the present embodiment, when the change condition is satisfied with the users US1 and US3 being in the proximal positional relationship, the character image of the user US3 is changed from the image of the special food character CS to the image of the main character CP3. For example, before the change condition is satisfied, the image of the special food character CS is displayed as the character image of the user US3. Then, when the change condition is satisfied, the image of the main character CP3 is displayed as the character image of the user US3 as illustrated in FIG. 13B. Thus, the simulation system capable of generating a virtual space image reflecting the positional relationship between users can be provided. In the present embodiment, when the change condition is satisfied as illustrated in FIG. 12, the change process for the game mode, such as changing the role of the user US3, is performed, whereby the gameplay condition of the user US3 is changed. Thus, the game thereafter progresses under a different gameplay condition, and thus a game of a novel type can be implemented.

When the change condition is satisfied by the contact between the users US1 and US3 described above, a new monster CM7 appears as illustrated in FIG. 12 to perform a circulating movement as indicated by A3. In other words, the increase of the number of main characters involves the increase in the number of monsters making the circulating movement, so that the game balance is adjusted.

As described above, in the present embodiment when the change condition is satisfied with the users being in the proximal positional relationship, the character image and the game mode are changed. In FIG. 5, only the user US1 is assigned to the role of the main character, and the users US2 and US3 are assigned to the roles of food characters, meaning that cooperative play by the users US1, US2, and US3 is weak. On the other hand, when the user US1 moves toward and contacts the users US2 and US3, the users US2 and US3 are assigned to the role of the main character in addition of the user US1 as illustrated in FIGS. 11 and 12. Thus, the cooperative play becomes stronger than that in FIG. 5, and thus the users can enjoy the fun of cooperating to clear the game, whereby a novel type of simulation system can be implemented.

Figure 14:
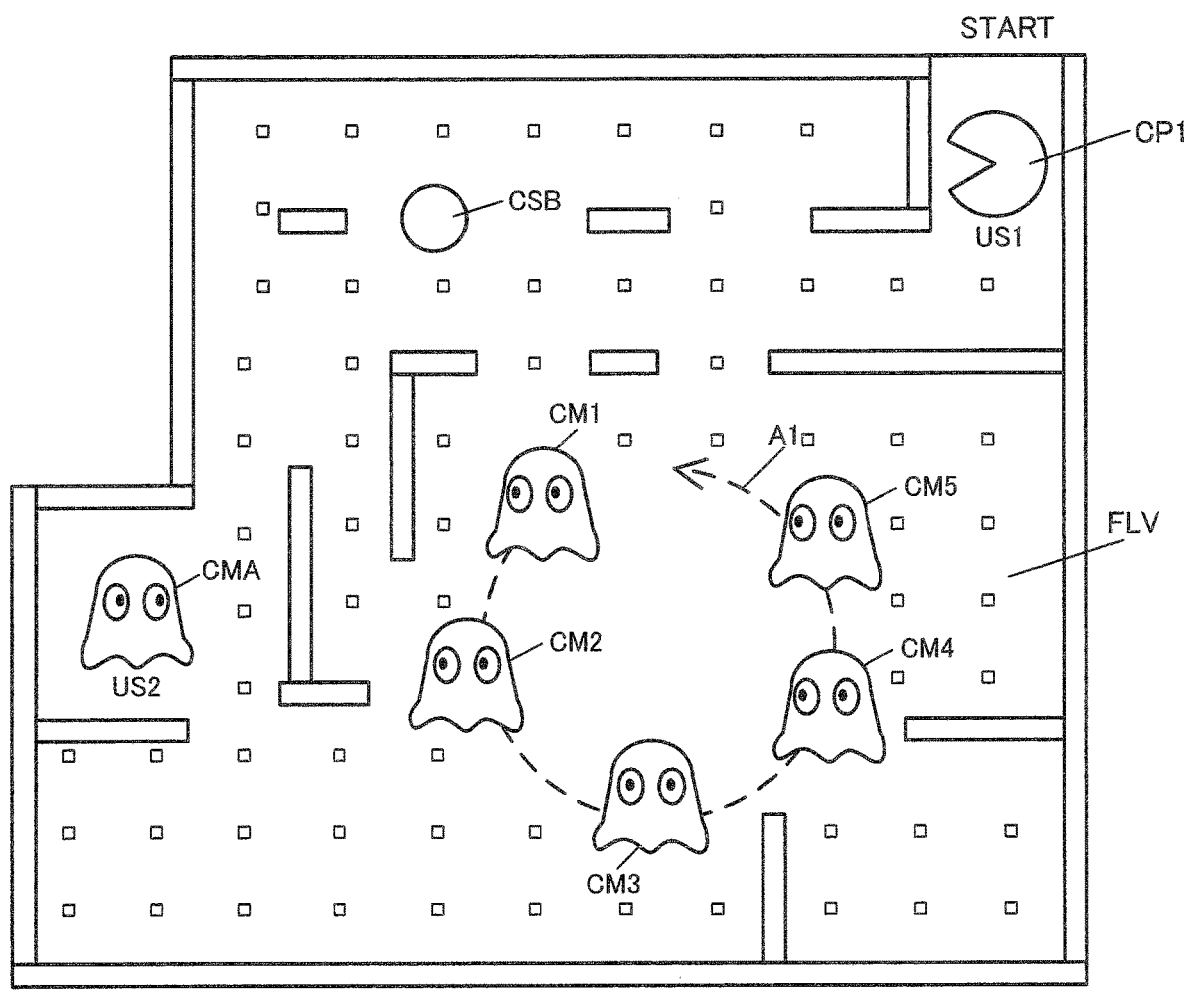
FIG. 14 is a drawing for describing a game implemented by the present embodiment.
Figure 15:
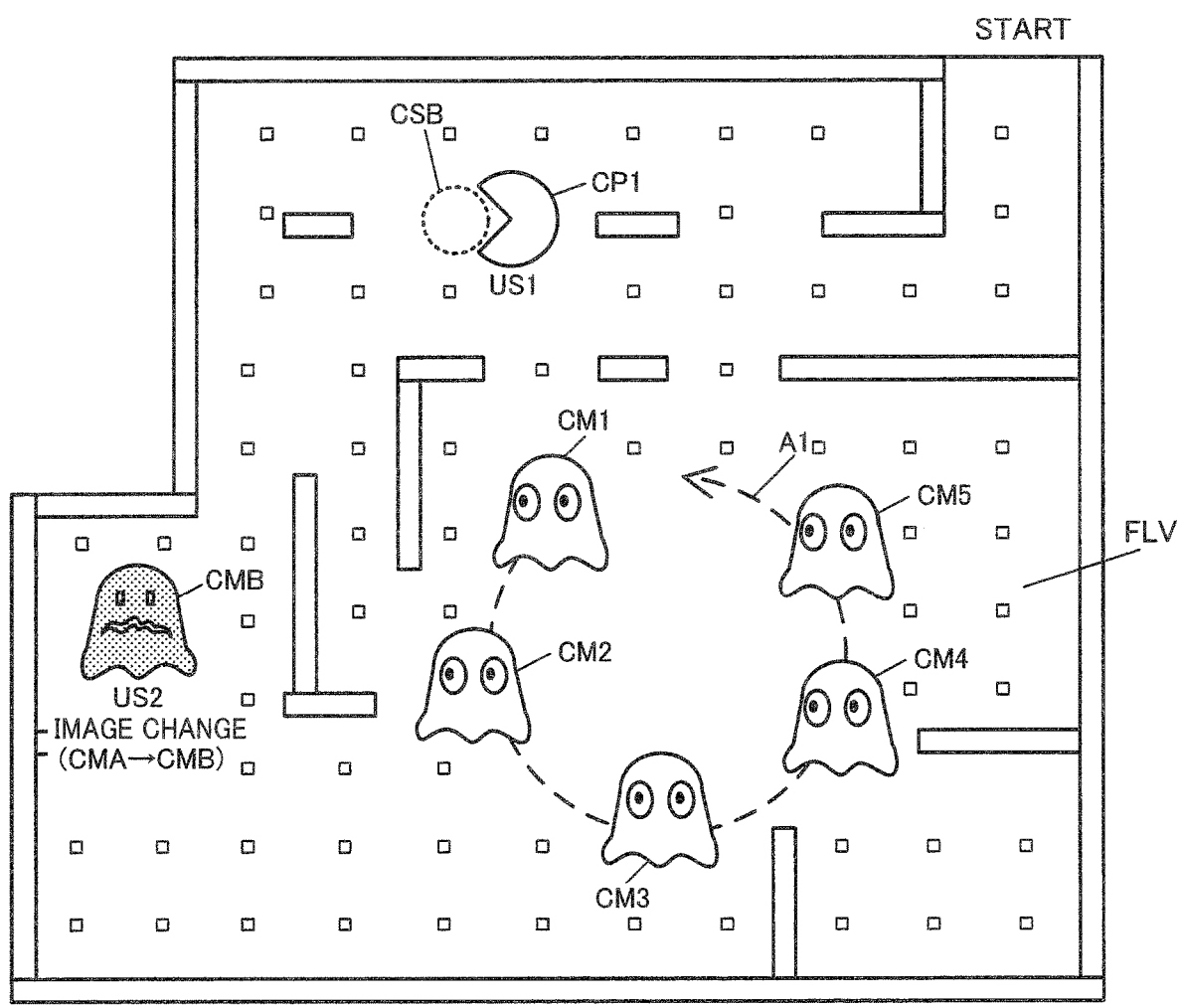
FIG. 15 is a drawing for describing a game implemented by the present embodiment.
Figure 16:
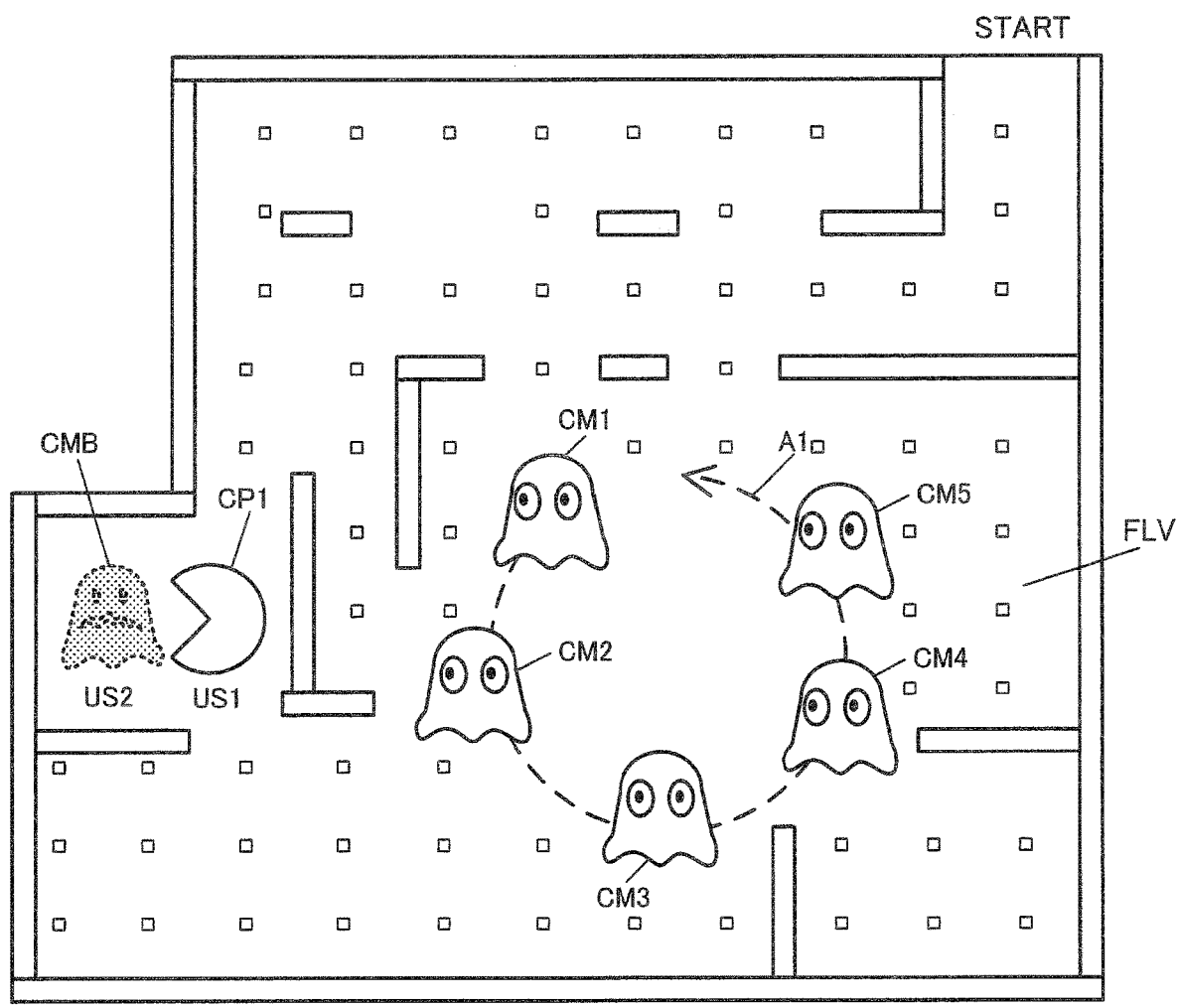
FIG. 16 is a drawing for describing a game implemented by the present embodiment.

Next, a modification of the present embodiment is described with reference to FIG. 14, FIG. 15, and FIG. 16. In FIG. 14, the users US1 and US2 are participated in the gameplay. The main character CP1 is displayed as the character image of the user US1, and an image of a monster CMA is displayed as the character image of the user US2. Thus, the user US1 is assigned to a role of the main character CP1, and the user US2 is assigned to a role of the monster CMA serving as an enemy. Thus, there is no user assigned to a role of a food character in FIG. 14. In FIG. 15, the main character CP1 corresponding to the user US1 is making an eating action after coming into contact with the special food CSB as the disposed object in the virtual space. As a result, the character image of the user US2 is changed from the image of the monster CMA into an image of a monster CMB as illustrated in FIG. 15. The monster CMA is a normal monster, whereas the monster CMB is a weakened monster (worried monster) which the main character CP1 can erase the monster CMB by being in contact with the monster CMB. For example, the role of the user US2 is changed from the role as the normal monster CMA to the role of the weakened monster CMB, and the game mode (the play condition of the user US2) is changed accordingly. In FIG. 16, the change condition is satisfied with the users US1 and US2 in proximal positional relationship as in FIG. 10, and thus the image change process is performed to erase the monster CMB corresponding to the user US2. Thus, with the modification illustrated in FIG. 14 to FIG. 16, a game featuring a battle between the users US1 and US2 respectively serving as the main character and the monster, can be implemented.

3.3 Examples of Various Processes

Next, examples of various processes according to the present embodiment will be described. In the present embodiment, a process is performed to change the display mode of the image of the user character or the other user character, in accordance with the operation information or the game status of the user or the other user.

Figure 17:
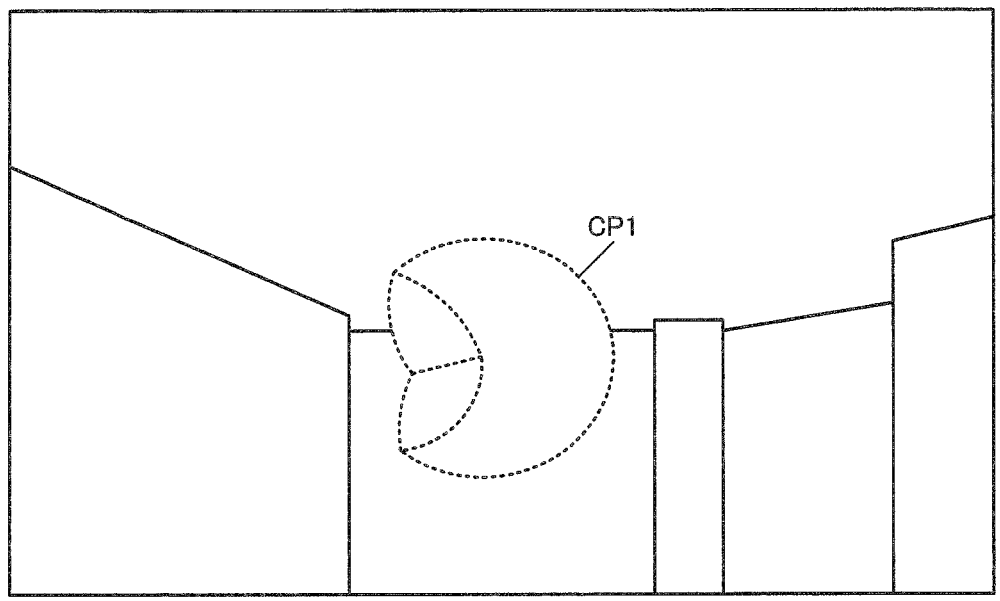
FIG. 17 is a drawing for describing a process of changing a display mode of an image of a character.

For example, in FIG. 17, the user has performed a predetermined operation or has used a predetermined item, so that the main character CP1 corresponding to the user is displayed in a transparent or semitransparent manner. For example, when the user performs the predetermined operation or uses the predetermined item, a command is activated so that the main character CP1 becomes invisible or difficult to see on the screen. For example, the display mode of the main character CP1 is changed so that the main character CP1 becomes invisible or difficult to see for a given period of time from a timing at which the predetermined operation is performed or the predetermined item is used. For example, the monster may move toward and corner the main character CP1 or put the main character CP1 in the other like critical situations. In such a case, the user performs the predetermined operation or uses the predetermined item so that the display mode of the main character CP1 is changed as illustrated in FIG. 17. As a result, the user can save him or herself from the critical situation.

The object as the main character CP1 may be changed to a less noticeable object, or a different object (mimesis). For example, the main character CP1 approached by a monster is temporarily changed to a monster character. As a result, the user can save him or herself from the critical situation because the approaching monster is unable to perform an act such as eating on the monster as a result of the change.

The change process for the display mode may be performed, for example, as an active camouflage process of changing the color to be the same as the background color, or a process of blurring the image of the character. Furthermore, the predetermined operation for performing the display mode change process is a special operation and the predetermined item used is a special item for example. For example, the special operation is an operation enabled when a given condition is satisfied based on the user's game level, game status, and the like. The special item is an item that can be obtained when the game level of the user exceeds a predetermined level or when the user pays money for the item. The user can play the game advantageously by performing such a special operation or using the special item.

In the present embodiment, the process of changing the display mode of the image of the user character or the disposed object is performed when the change condition is determined to be satisfied with the user and the disposed object being in the given positional relationship.

Figure 18A:
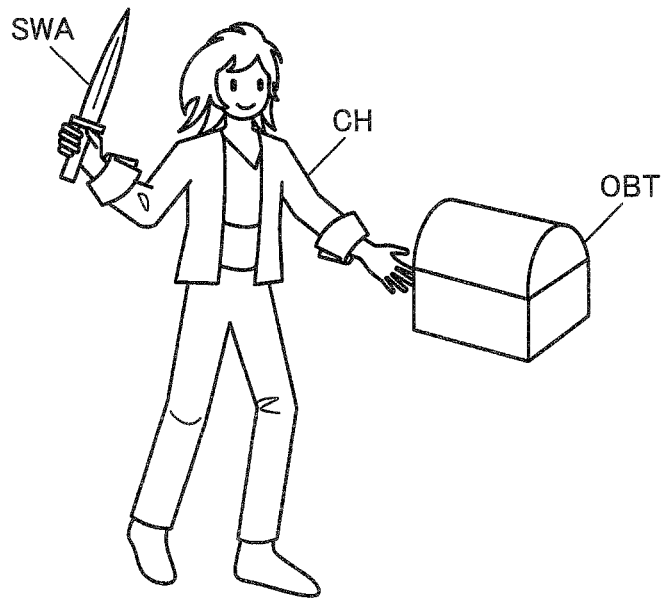
FIG. 18A to FIG. 18C are drawings for describing a process for changing a display mode of images of a character and a disposed object.
Figure 18B:
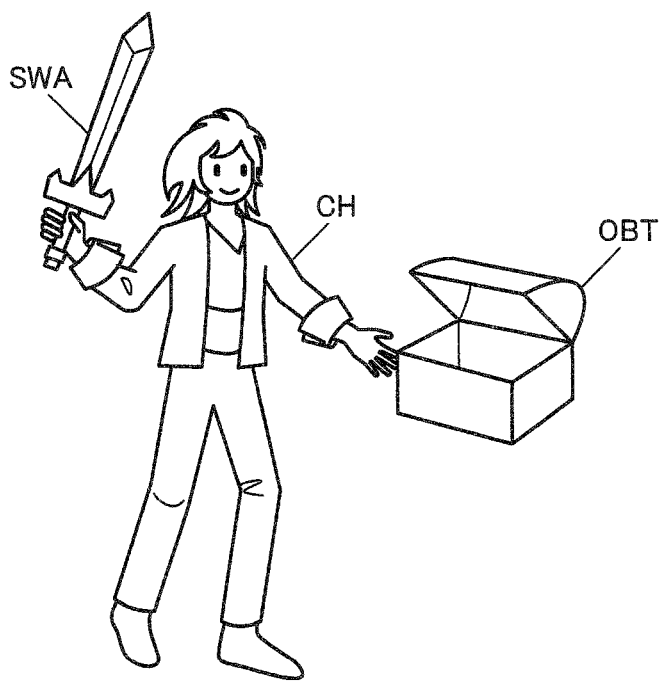
Figure 18C:
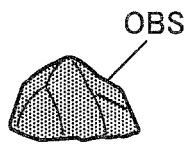

For example, FIG. 18A illustrates an RPG game where a character CH (user character), corresponding to the user, moves on a map to search for a treasure. In FIG. 18A, the character has found a treasure object OBT (a disposed object in a wider sense), and is in contact with the treasure object OBT. When the change condition is satisfied with the user and the object OBT being in contact (proximal) positional relationship, a process of changing the display mode of an image of the character CH and an image of the object OBT is performed as illustrated in FIG. 18B. For example, the character CH has a sword SWA in FIG. 18A, and the sword held by the character CH is changed to a sword SWB that was in the treasure object OBT in FIG. 18B. Thus, the display mode of the image of the character CH has changed. The display mode of the image of the object OBT is also changed to an image of an open treasure chest. After a further elapse of time, the treasure chest object OBT changes into a rock object OBS as illustrated in FIG. 18C.

Thus, in the present embodiment, the display mode is changed not only in the case where the users achieve the given positional relationship, and is also changed for the image of the user character and/or the disposed object when the user and the disposed object achieve given positional relationship such as contact relationship or proximal relationship. Thus, a virtual space image reflecting the positional relationship between the user and the disposed object can be generated, whereby a novel simulation system can be implemented. The position information about the disposed object is, for example, stored in the object information storage section 172 in FIG. 1 as coordinates information about the disposed object, and thus can be determined based on the coordinates information. Alternatively, the marker (QR marker) may be disposed at the position in the real space corresponding to the position of the disposed object in the virtual space, and the position information about the disposed object may be acquired by performing image recognition on the marker using a camera or the like.

In the present embodiment, the change process corresponding to the type of the user character, the other user character, or the disposed object is performed.

Figure 19A:
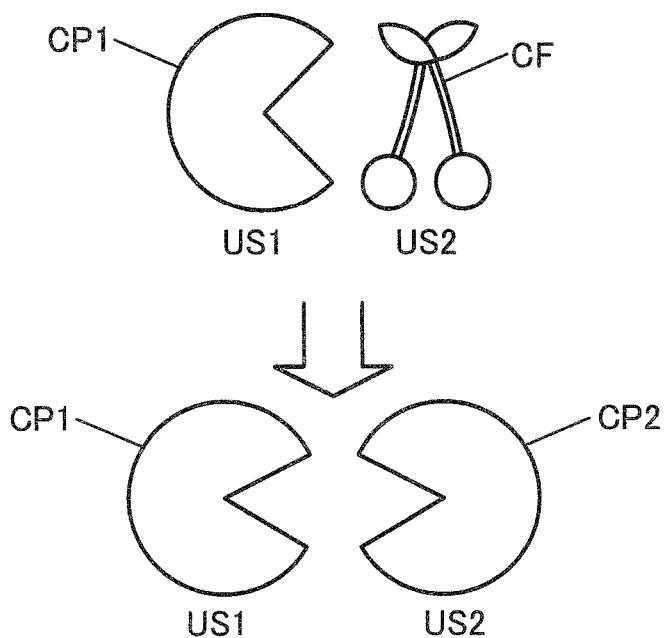
FIG. 19A and FIG. 19B are drawings for describing a change process corresponding to types of characters.

For example, in FIG. 19A, the types of the user characters of the users US1 and US2 respectively are the main character CP1 and the food character CF. When the users US1 and US2 come into contact with each other (achieve contact positional relationship) so that the change condition is satisfied, the type of the character of the user US2 is changed from the food character CF to the main character CP2.

Figure 19B:
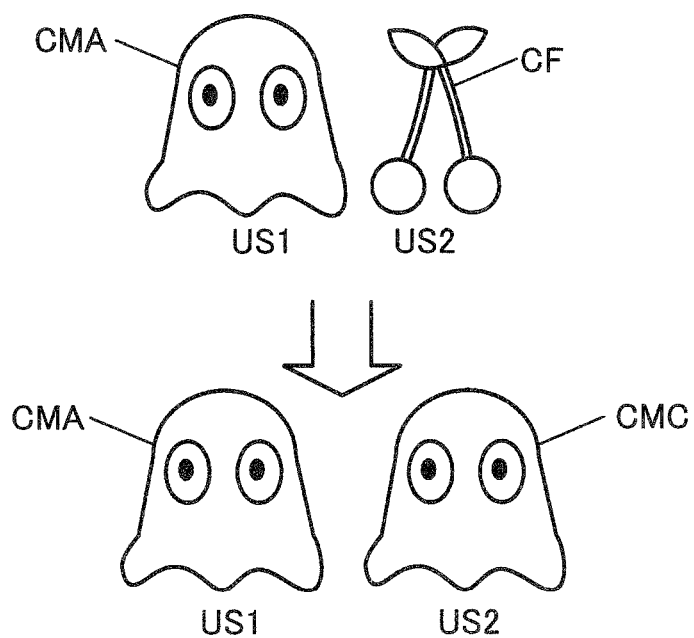

In FIG. 19B, the types of the user characters of the users US1 and US2 respectively are the monster CMA and the food character CF. When the users US1 and US2 come into contact with each other so that the change condition is satisfied, the type of the character of the user US2 is changed from the food character CF to the monster CMC.

Thus, the food character CF is changed to the main character CP2 as a result of being in contact with the main character CP1 in FIG. 19A, and is changed to the monster CMC as a result of being in contact with the monster CMA in FIG. 19B. Thus, the type of character into which the food character CF is changed is different in accordance with the type of character contacted by the food character CF, whereby the change process is performed in accordance with the type of the character.

Alternatively, the main character CP1 of the user US1 may be changed to the food character CF, when the main character CP1 and the food character CF come into contact with each other, as illustrated in FIG. 19A. Furthermore, the monster CMA of the user US1 may be changed to the food character CF, when the monster CMA and the food character CF come into contact with each other, as illustrated in FIG. 19B.

As described above, in the present embodiment, the change process is performed in accordance with the type of the main character CP1 that is the user character and the type of the food character CF that is the other user character. Similarly, for example, the change process may be performed in accordance with the type of the character CH or the type of the object OBT, when the character CH that is the user character and the object OBT that is the disposed object, as illustrated in FIG. 18A and FIG. 18B, come into contact with each other. Thus, the change process is performed in accordance with the type of the character or the type of the disposed object. Alternatively, the game mode change process may be performed in accordance with the type of the character or the type of the disposed object.

In this manner, various change processes are performed in accordance with the type of the user character, the type of the other user character, or the type of the disposed object. Thus, the change processes of various contents are performed when the change condition is satisfied, whereby the exciting and strategic aspects of the game can be increased.

In the present embodiment, the change process is performed in accordance with the relationship information between the user and the other user or between the user and the disposed object.

Figure 20A:
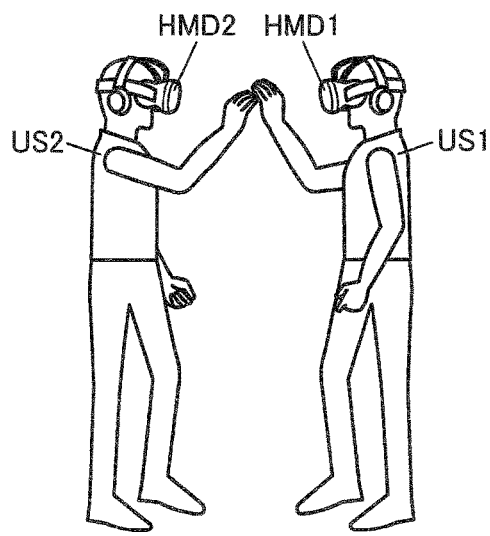
FIG. 20A and FIG. 20B are drawings for describing a change process corresponding to relationship information between users.
Figure 20A:
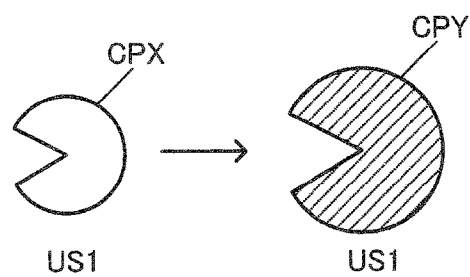

For example, in FIG. 20A, the user US1 and the user US2 are in the same group (team), and thus are on the same sides. When the change condition is satisfied with the user US1 approaching the user US2 and performing the first high five, the character of the user US1 is changed from a character CPX to a character CPY. The character CPY is a character that is larger than and has a color different from the character CPX. The character CPY also features a larger increasing rate of point obtained by eating dots, compared with the character CPX.

Figure 20B:
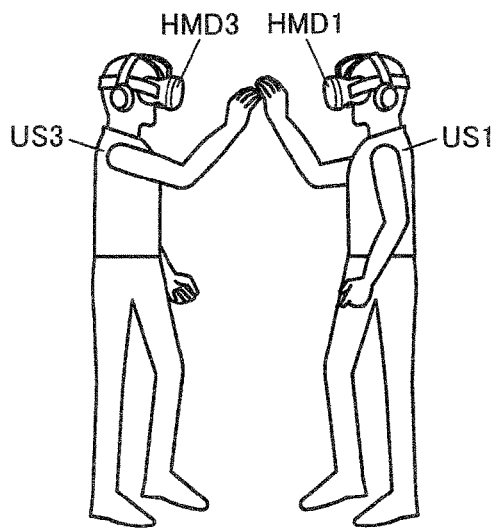
Figure 20B:
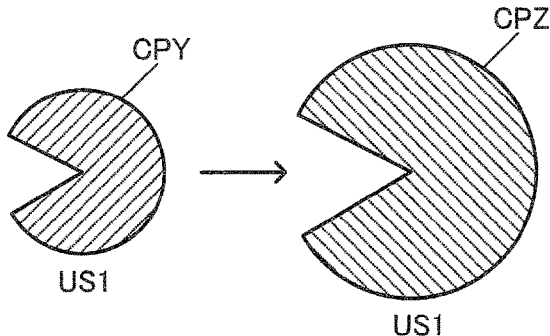

In FIG. 20B, the user US1 and the user US3 are also in the same group, and thus are on the same sides. When the change condition is satisfied with the user US1 approaching the user US3 and performing the second high five, the character of the user US1 is changed from the character CPY to a character CPZ. The character CPZ is a character that is larger than and has a color different from the character CPY. The character CPZ also features a larger increasing rate of point obtained by eating dots, compared with the character CPY. In this manner, the user US1 can make the shape, the color, and the ability of his or her character changed by sequentially performing high five with the team mates, and thus can improve its character. Thus, the change process reflecting the relationship information between the user and the other user and the relationship information between the user and the disposed object can be implemented, whereby the exciting and strategic aspects of a multiplayer game played by a plurality of users can be increased.

As described above, in the present embodiment, when the user and the other user come into contact with each other, the display mode of each of the users and the game mode change in accordance with whether or not they are on the same sides. For example, the character can become stronger or acquire a new ability when the users in predetermined relationship come into contact with each other. Alternatively, when a user comes into contact with a disposed object in predetermined relationship with the user, a special change process is performed for the disposed object. For example, a change process is performed so that the disposed object which was nothing but an obstacle changes into a treasure chest. In this manner, a novel simulation system based on VR, AR, or MR can be implemented.

In the present embodiment, a change process is performed based on the game level or the gameplay history of the user or the other user.

Figure 21:
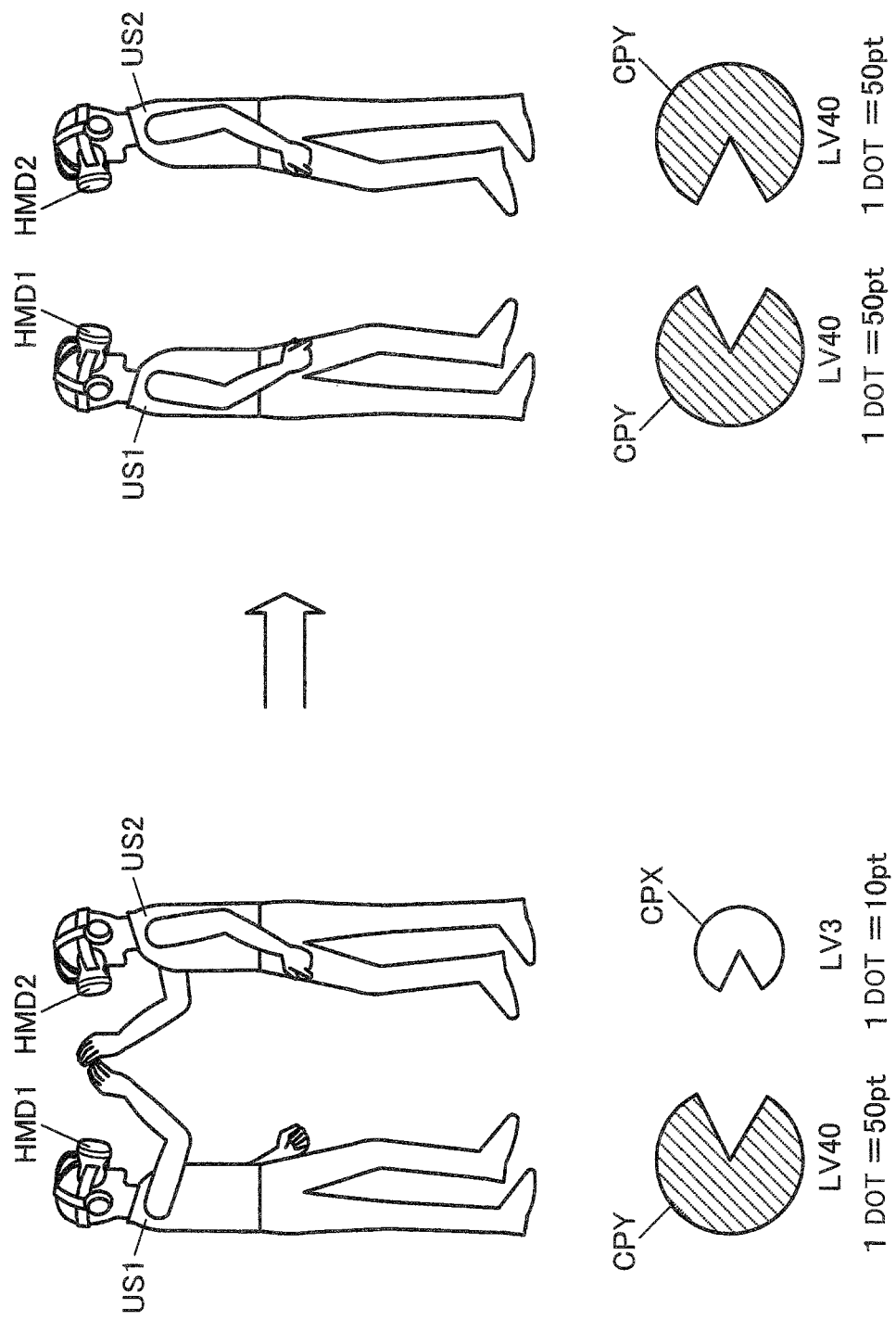
FIG. 21 is a drawing for describing a change process corresponding to user levels.

For example, in FIG. 21, the game level of the user US1 is 40, and thus is higher than the game level of the user US2 which is 3. The character CPY corresponding to the user US1 can obtain 50 points each time it eats a dot, whereas the character CPX corresponding to the user US2 can only obtain 10 points each time it eats a dot. Thus, the character CPY has a higher ability (ability parameter) than the character CPX.

The change condition may be satisfied with the users US1 and US2 in such relationship regarding the game level performing high five. In such a case, the character of the user US2 at a lower level changes from the character CPX to the character CPY as illustrated in FIG. 21. For example, after the high five, the character of the user US2 is changed from the character CPX to the character CPY for a given period of time. The character CPY can obtain 50 points each time it eats a dot, as in the case of the character CPY of the user US1, and thus the characters have the same ability. In this manner, the change process for the character image and the game mode reflecting the game levels of the users can be implemented. For example, in FIG. 21, the game mode is changed with the image of the character of the user US2 changed and with the change process for the game result calculation scheme performed.

The change process not reflecting the game level but reflecting the gameplay history may be performed. For example, the content of the change process for the character image and/or the game mode change process may be changed in accordance with the gameplay history including how many times/how frequently the user has played the game in the past, and the game results (wins and losses). For example, the character image and the game result calculation scheme can be changed so that a user who has played the game many times/frequently, or made good game result becomes more advantageous.

In the present embodiment, the game mode change process is performed as the change process, when the change condition is determined to be satisfied. For example, when the change condition is satisfied, the change process is performed for not only the image of the character but also the game mode. In this manner, the game mode also changes in various ways in response to the achievement of the given positional relationship between the users or between the user and the disposed object, whereby a process for a game developing in various ways can be implemented.

Specifically, in the present embodiment, the game mode change process is performed to change the game result calculation scheme when the change condition is satisfied.

Figure 22:
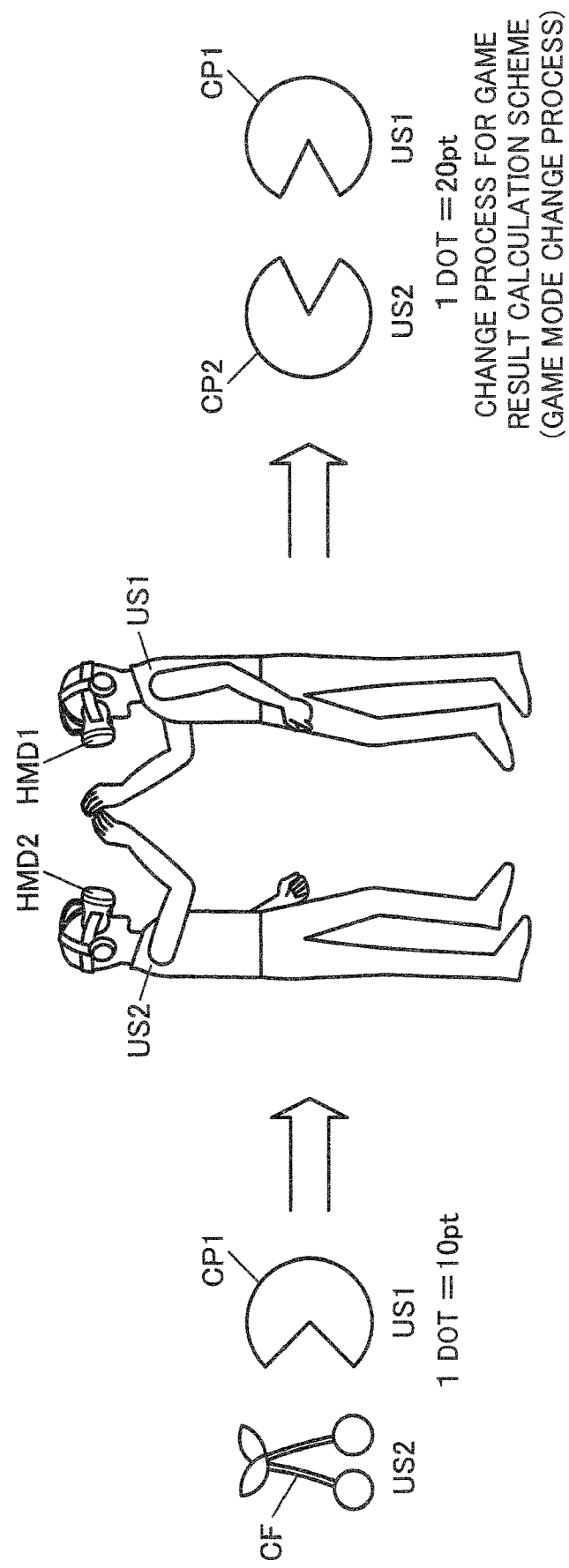
FIG. 22 is a drawing for describing a game mode change process for changing game result calculation schemes.

For example, in FIG. 22, before the users US1 and US2 perform high five, the main character CP1 of the user US1 can obtain 10 points each time it eats dot, whereas the food character CF of the user US2 cannot eat dots, and thus cannot obtain points by eating dots.

Then, when the change condition is satisfied with the users US1 and US2 performing high five, the change process for the game result calculation scheme is performed as the game mode change process. For example, as a result of the change process for the game result calculation scheme, the main character CP1 of the user US1 can obtain 20 points each time it eats a dot, which is larger than that obtained by eating a dot before the high five. When the change condition is satisfied, the character of the user US2 is changed from the food character CF to the main character CP2. Then, the main character CP2 of the user US2 can obtain 20 points each time it eats a dot. Thus, the user who cannot obtain a point by eating a dot or cannot even eat a dot before the high live, can obtain a point after the high five, and thus the game result calculation scheme is changed for the character of the user US2.

In this manner, the image of a character or a disposed object is changed and also the game result calculation scheme is changed when given positional relationship is achieved by users or by a user and a disposed object, whereby strategic and exciting aspects of the game can be increased.

In the present embodiment, the change process for the role of the user or the other user in the game is performed as the game mode change process, when the change condition is satisfied. The image of the user character or the other user character is changed to an image of a character corresponding to the changed role.

Figure 23:
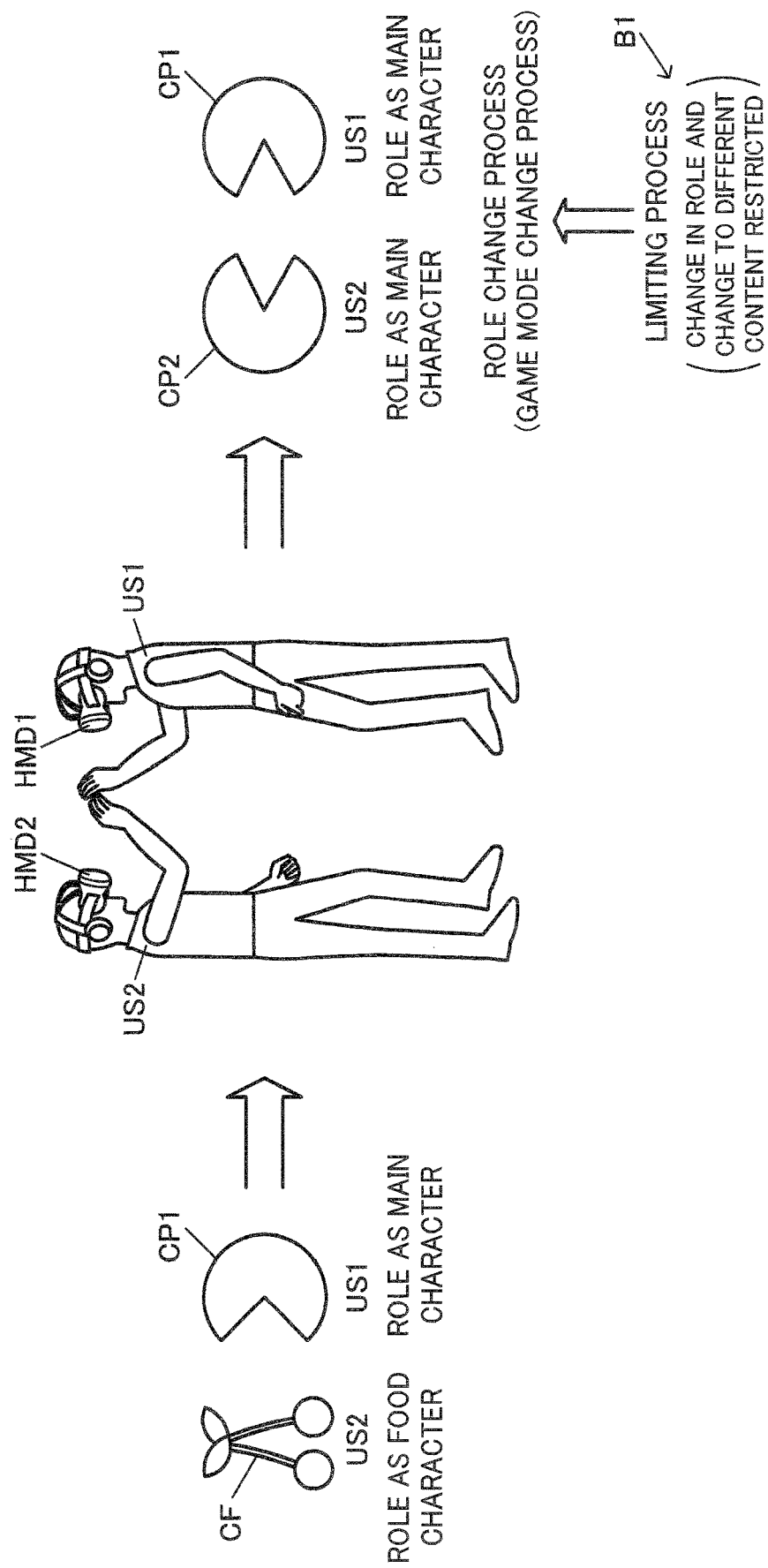
FIG. 23 is a drawing for describing a game mode change process for changing user roles.

For example, as illustrated in FIG. 23, the user US1 is assigned to the role of the main character CP1 and the user US2 is assigned to the role of the food character CF, before the high five by the users US1 and US2. When the change condition is satisfied with the high five performed, the change process for the users' role is performed as the game mode change process. For example, in FIG. 23, the role of the user US2 is changed from the role as the food character CF to the role as the main character CP2. For example, the food character CF cannot eat dots, and thus cannot obtain a point by eating dots. Furthermore, the food character CF does not interact with a monster, and thus no event occurs as a result of the contact between a monster and the food character CF. On the other hand, the main character CP2 can obtain a point by eating a dot. The main character CP2 is eaten to disappear upon coming into contact with a normal monster, and can erase a weakened monster upon coming into contact with the monster. Thus, the role in the game is largely different between the food character CF and the main character CP2. In the present embodiment, when the change condition is satisfied, this role change process is performed so that the game mode change process is implemented. Thus, a change process where the change in the role of the user is linked with the image of the character can be implemented.

In the present embodiment, as indicated by B1 in FIG. 23, a limiting process may be performed for the role change process. For example, a process of restricting the change of a role and limiting a change in a content is performed.

For example, when the food character is changed to the main character as illustrated in FIG. 23, percentage of the number of main characters increases. For example, in a game played by 10 users in the play field FL, the number of main character which is one at first may increase to 2, 3, 4, and 5 due to the role change process. Thus, the percentage of the number of main characters to the percentage of the number of monsters increases, resulting in the users being too predominant in the game. Thus, in such a case, the role change process from the food character to the main character is limited, and the role change process is restricted for example. Alternatively, the content of the role change process is changed. For example, the content of the role change process, performed when the change condition is satisfied, is changed so that the role of the food character is changed to the special food character or the monster, instead of being changed to the main character. As a result, the change process for the role of the user can be prevented from being performed unlimitedly, and thus the game balance can be appropriately adjusted.

In the present embodiment, the change mode indicating how the game mode is changed is changed in accordance with the timing at which the change condition is satisfied, when the limited time period is set for the gameplay from the game start.

Figure 24:
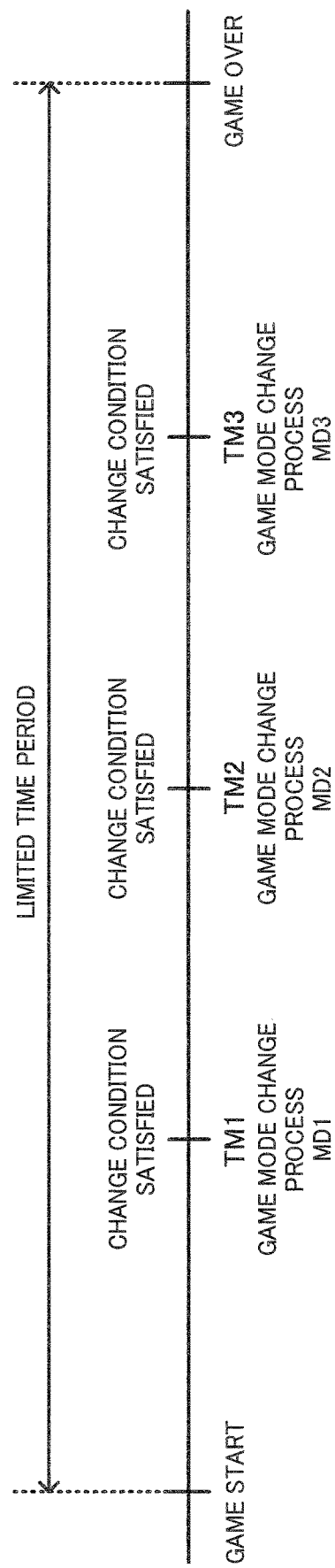
FIG. 24 is a drawing for describing a process for changing the change mode indicating how a game mode is changed, in accordance with a timing within a limited time period.

For example, in FIG. 24, a limited time period TL is set for the gameplay between the game start and the game over. In the example illustrated in FIG. 9A to FIG. 9C, the limited time period is 300 seconds. A game mode change process MD1 is performed when the change condition is satisfied at a timing TM1 within the limited time period TL. Similarly, game mode change processes MD2 and MD3 are respectively performed when the change condition is satisfied at timings TM2 and TM3 within the limited time period TL. The content of the change process is different among the game mode change processes MD1, MD2, and MD3 respectively corresponding to the timings TM1, TM2, and TM3.

For example, the change condition may be satisfied with the food character of a user coming into contact with a main character of the other user at the timing TM1 within the first half of the limited time period TL. In such a case, the game mode change process MD1 is performed to change the role of the user from the food character to the main character. The change condition may be satisfied with the food character of a user coming into contact with a main character of the other user at the timing TM2 around the middle of the limited time period TL. In such a case, the game mode change process MD2 is performed with no role change process performed so that the role of the user remains the same. The change condition may be satisfied with the food character of a user coming into contact with a main character of the other user at the timing TM3 within the second half of the limited time period TL. In such a case, the game mode change process MD3 is performed to change the role of the user from the food character to the monster.

Alternatively, when the change condition is satisfied at the timing TM1 within the first half, the game mode change process MD1 is performed so that the food character is changed to the main character that can obtain 10 points each time it eats a dot. When the change condition is satisfied at the timing TM3 within the second half, the game mode change process MD3 is performed so that the food character is changed to the main character that can obtain 40 points each time it eats a dot.

In this manner, the content of the game mode change process is changed in a wide variety of ways in accordance with the timing at which the change condition is satisfied within the limited time period, whereby various game processes can be implemented.

In the present embodiment, when a plurality of users playing in the real space is assigned to a plurality of roles (the first to the M-th roles), the game mode change process is performed based on the percentage information about the number of users assigned to a plurality of roles.

Figure 25A:
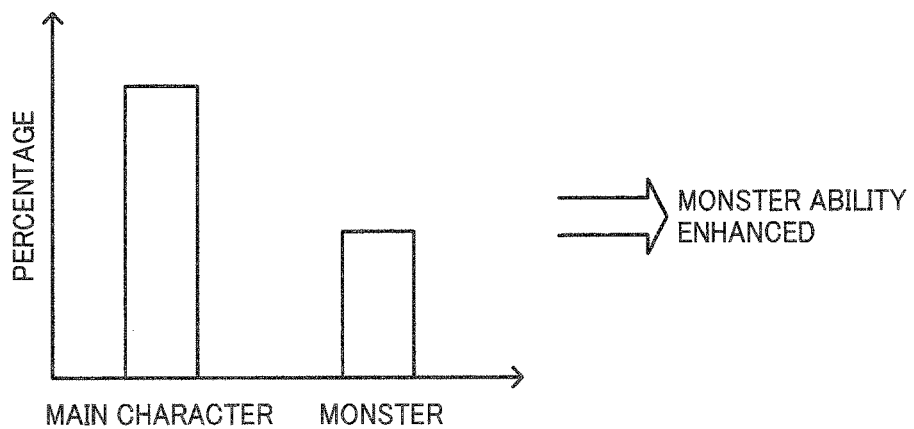
FIG. 25A and FIG. 25B are drawings for describing a game mode change process based on user role percentage information.

For example, in FIG. 25A, the percentage of the number of users assigned to the role of the main character is larger than the percentage of the number of users assigned to the role of the monster. In such a case, for example, the game mode change process is performed to enhance the ability of the monster. For example, the game mode change process such as increasing the movement speed of the monster is performed. Alternatively, the game mode change process such as slowing down the movement speed of the main character or reducing the number of points obtained by eating a dot is performed. In this manner, the unbalanced gameplay due to the increased ratio of the main character can be appropriately biased.

Figure 25B:
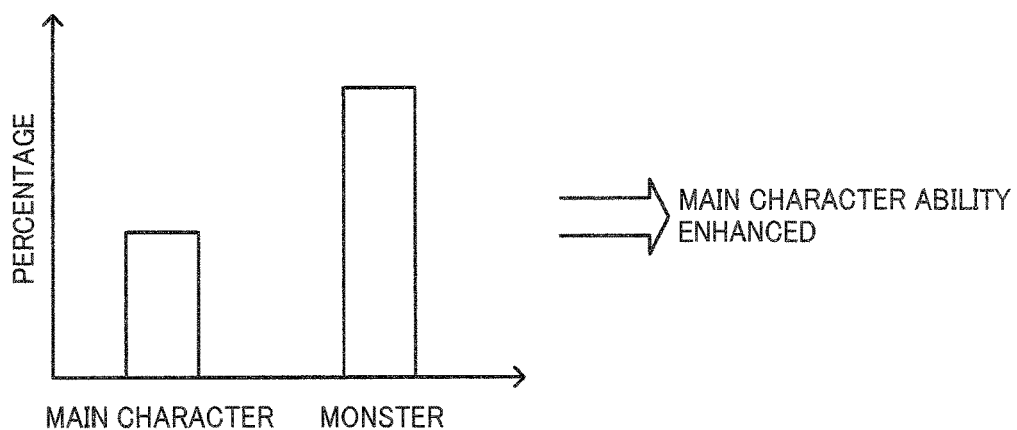

In FIG. 25B, the percentage of the number of users assigned to the role of a monster is larger than the percentage of the number of users assigned to the role of a main character. In such a case, the game mode change process is performed to enhance the ability of the main character. For example, the game mode change process such as increasing the movement speed of the main character or increasing the number of points obtained by eating a dot is performed. Alternatively, the game mode change process such as slowing down the movement speed of the monster is performed. In this manner, the unbalanced gameplay due to the increased ratio of the monster can be appropriately biased. Thus, the users can be prevented from assigned to the roles in an unbalanced manner.

In the present embodiment, a notification process is performed for a change status of positional relationship among a plurality of users playing the game, and of a change process.

For example, in FIG. 26A, users A and B successfully performed the high five after being in the proximal positional relationship. As a result, a UI screen notifying that the role of the user B is changed to the main character is displayed on the HMDs. Thus, the notification process is performed for a status of the positional relationship among a plurality of users playing the game. With this configuration, an improved user interface can be provided so that the user playing game can easily recognize the status of the positional relationship among users.

In FIG. 26B, a UI screen notifying the number of users allocated to the main character and the number of users allocated to the monster under the current status is displayed on the HMDs. Thus, the notification process is performed for the change status of the change process. With this configuration, an improved user interface can be provided so that the user playing game can easily recognize the current status of the change process.

In the present embodiment, the change condition is determined to be satisfied when the user and the other user or disposed object are determined to be in the given positional relationship and the user is determined to have performed the given action. For example, in FIG. 10, the users US1 and US2 are determined to be in the proximal positional relationship due to a small distance LD between the users US1 and US2. Then, when the users US1 and US2 perform the high five action as illustrated in FIG. 10, the change condition is determined to be satisfied. Whether the users US1 and US2 have performed the high five action can be determined through detection of posture information (gesture) about the users US1 and US2 and the like. Alternatively, in a game using a gun, whether the users have performed a given action for satisfying the change condition can be determined by determining whether the user has performed a gun-firing operation using a gun-shaped controller. In this manner, whether or not the change condition is satisfied can be determined not only based on the positional relationship between users and/or between a user and a disposed object, but also based on the action performed by the user.

In the present embodiment, the route setting object for setting the route of the movement of the user is disposed in the virtual space, and the process is performed for a game played by the user by moving along the route. For example, as described above with reference to FIG. 5, the route setting objects OB1 to OB19 for setting the route along which the users US1, US2, and US3 move are disposed in the play field FLV in the virtual space. The users US1, US2, and US3 perform gameplay by moving along the route set by the route setting objects OB1 to OB19. For example, when the users US1, US2, and US3 move along the route, the main character CP1, the food character CF, and the special food character CS respectively corresponding to the users US1, US2, and US3 move along the route. In this manner, a game can be played by moving along a virtual route set by a virtual object disposed in the virtual space.

Figure 27A:
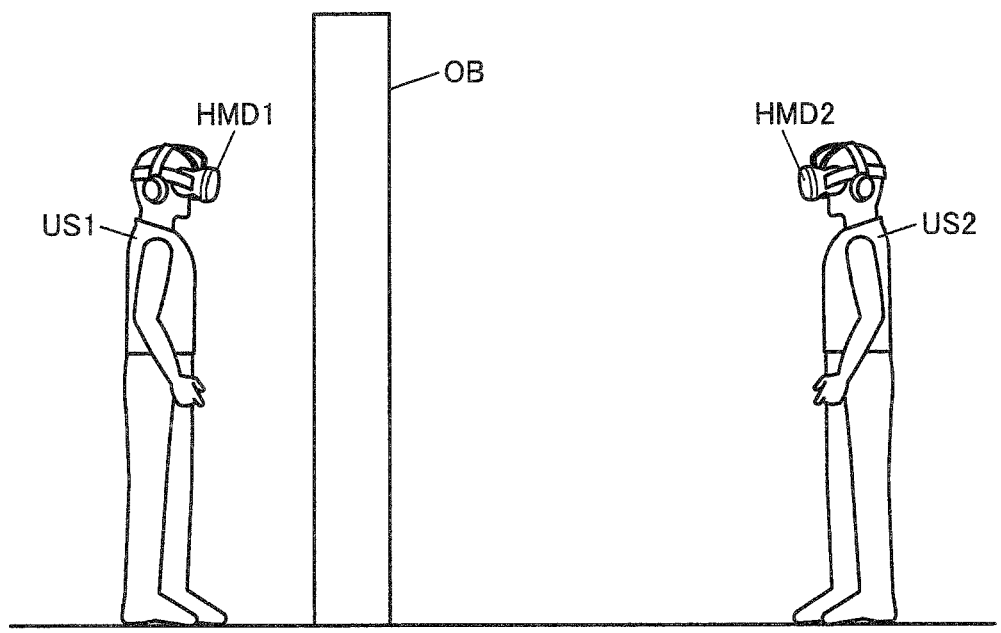
FIG. 27A and FIG. 27B are drawings for describing a penalty process according to the present embodiment.

In the present embodiment, a penalty process is performed on the user when the user is determined to have moved through or have come into contact with the route setting object. For example, in FIGS. 27A and 27B, the user US1 wearing the HMD1 has crossed and passed through the route setting object OB disposed in front of him or her. For example, as described above, the route setting objects OB14 to OB19 as illustrated in FIG. 5 correspond to walls in the real space as illustrated in FIG. 4. However, there is no object in the real space corresponding to the route setting objects OB1 to OB13. Thus, as illustrated in FIG. 27A and FIG. 27B, the user US1 can cross and pass through the route setting object OB with no corresponding object in the real space.

The gameplay of the user US1 who has passed through in this manner is set to be disadvantageous. For example, in FIG. 27A, the role of the user US1 is a main character and the role of the user US2 is a monster who has been weakened as illustrated in FIG. 15. When the user US1 passes through the object OB in this situation, the main character of the user US1 would erase the weakened monster of the user US2.

Figure 27B:
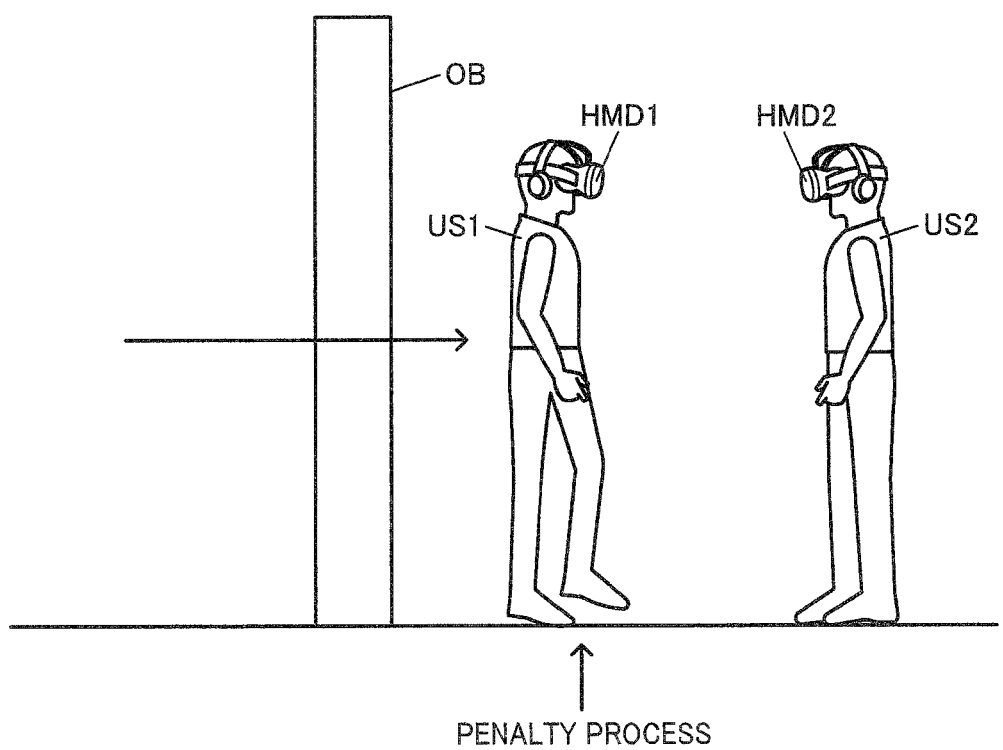

To prevent this, a penalty process is performed on the user US1 who has moved through the object OB as illustrated in FIG. 27B. For example, a penalty process is performed to disable the movement or the dot eating action of the main character of the user US1 for a predetermined period of time. With such a penalty process, actions of the user US1 to pass through or come into contact with the object OB1 can be restricted, whereby the incident described above can be prevented from occurring.

In the present embodiment, a camera that captures an image of the real space (the space in the real world) is preferably installed on the HMD worn by the user and the like. For example, the RGB camera 246 and the depth camera 247, or the environment recognition cameras 248 and 249 described above with reference to FIG. 3 are installed. Then, with this camera, recognition process is performed for the marker (a marker object, a QR code (QR code is a registered trademark)) disposed in the real space or attached to the user, and the position information about the user in the real space can be detected based on the recognition result. For example, the current position of the user can be recognized with a plurality of markers disposed in the real space, and with each marker recognized with the camera provided to the HMD. Specifically, the current position of the user can be schematically recognized with a plurality of markers disposed in a form of a matrix for example in the play field in the real space, and with the marker recognized with the camera. Then, whether or not the users are in contact with each other is determined by determining the position information about the user and the position information about the other user in the management processing apparatus such as a server, by recognizing the current position and the information about the marker provided to the other user with the camera. Specifically, the marker of each of the users US1 and US2 is recognized, and then the camera provided to the HMD of one of the users US1 and US2 is used to recognize the marker provided to the other one of the users. For example, when the marker attached to one of the users US1 and US2 in proximity with each other is recognized to have a predetermined size in the field of view of the camera of the HMD of the other one of the users, the users US1 and US2 are determined to be in proximity with each other while facing each other as illustrated in FIG. 10, and thus the change condition is determined to be satisfied. For example, the users US1 and US2 in proximity with each other while facing opposite directions cannot perform the high five as illustrated in FIG. 10. Furthermore, the marker would not be in the field of view of the camera, and thus the change condition is not satisfied. Various markers can be used. For example, a marker (AR marker) an orientation and the like of which can be determined by using a perspective of the image, a marker that is implemented with a geometrical pattern such as a QR code, and a marker as a light emitting body that emits light at a predetermined frequency can be used. The object image itself may be recognized as the marker.

4. Process Details

Figure 28:
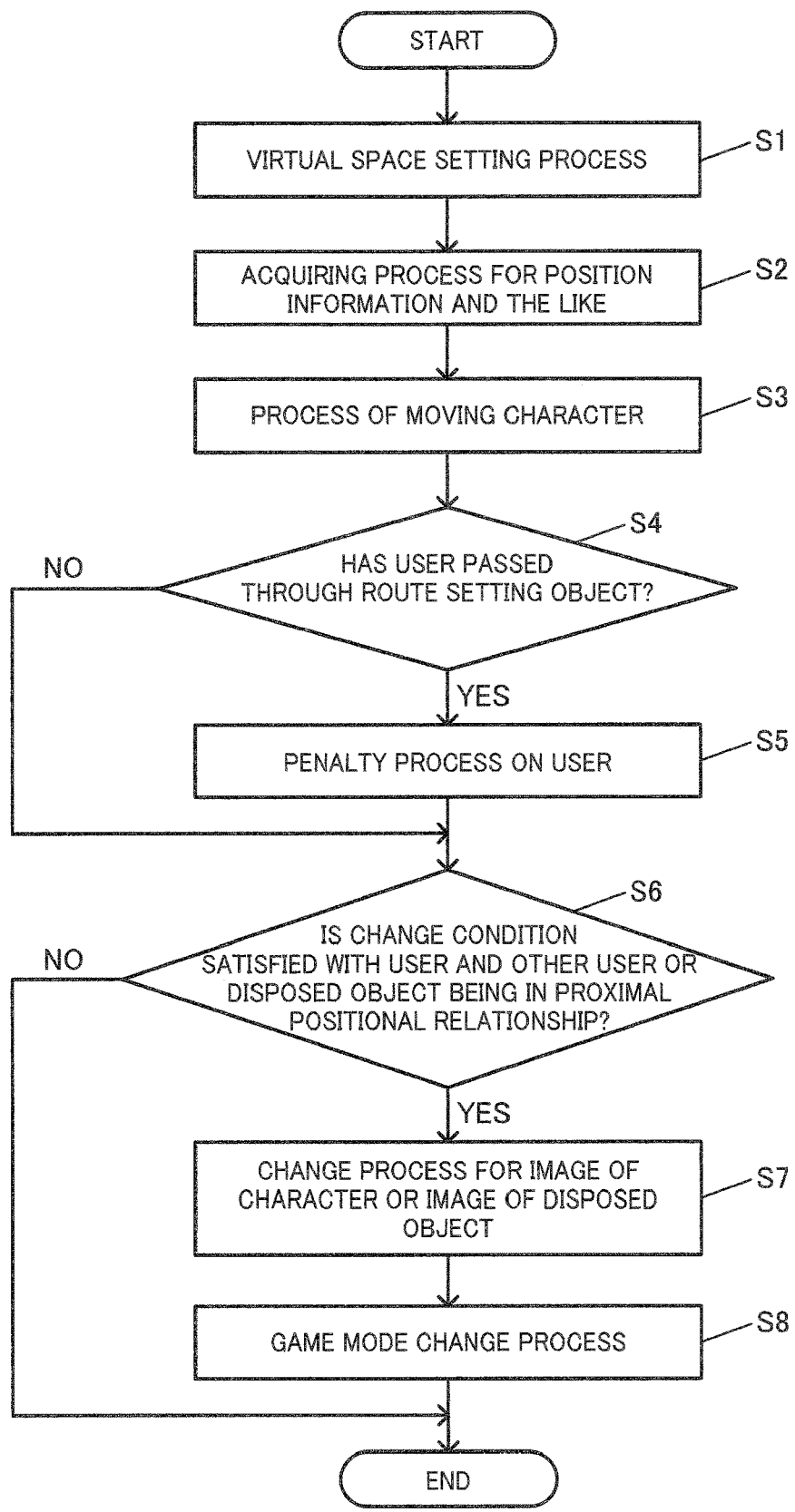
FIG. 28 is a flowchart illustrating a detailed process example according to the present embodiment.

Next, a detailed example of a process according to the present embodiment is described with reference to a flowchart in FIG. 28.

First of all, a virtual space setting process is performed (step S1). For example, the virtual space setting process as illustrated in FIG. 5 is performed. Then, an acquiring process for the position information about the user and the like is performed (step S2). For example, position information, direction information, posture information, and the like about the user are acquired by the tracking process described with reference to FIG. 2A to FIG. 4. Next, a process of moving the character corresponding to the user in the set virtual space is performed (step S3). For example, the character is moved in the virtual space to be linked with a movement of the user in the real space.

Next, whether or not the user has passed through the route setting object is determined (step S4). For example, whether or not the user has crossed and passed through the route setting object as illustrated in FIG. 27A and FIG. 27B is determined. When the user has passed through the route setting object, the penalty process is performed on the user (step S5).

Next, whether or not the change condition is satisfied with the user and the other user or disposed object being in the proximal positional relationship is determined (step S6). For example, the change condition is determined to be satisfied when the users in the proximal positional relationship perform a given action such as high five. When the change condition is satisfied, the change process is performed for the image of the character or the image of the disposed object (step S7). For example, the image change process as illustrated in FIG. 5 to FIG. 18C is performed. Furthermore, the game mode change process is performed (step S8). For example, the game mode change process is performed with various methods described with reference to FIG. 22 to FIG. 25B.

Although the present embodiment has been described in detail above, those skilled in the art will readily appreciate that many modifications are possible in the embodiment without materially departing from the novel teachings and advantages of the present disclosure. Accordingly, all such modifications are intended to be included within the scope of the present disclosure. For example, each the terms (such as proximal/contact positional relationship, high five action) that are at least once written together with a term of a wider sense or an alternative term (such as given positional relationship, given action) in the specification or the figures, can be replaced with the alternative term at any part of the specification or the figures. The processes of acquiring the position information, the game process, the process of setting the virtual space, the display process, the process of changing images, the process of changing the game mode, and the like are not limited to those described in the present embodiment. The scope of the present disclosure includes methods, processes and configurations equivalent to these. The embodiments can be applied to various games. The embodiments can be applied to various simulation systems such as an arcade game apparatus, a consumer game apparatus, a large attraction system where a large number of users play the game, and the like.

What is claimed is:

1. A simulation system comprising:
a processor including hardware, the processor being configured to perform:
an information acquiring process of acquiring position information about a first user and a second user each moving in a real space, the position information being detected by at least one sensor;
a game process of executing a game played by the first user and the second user;
a virtual space setting process of setting a virtual space, which is a three dimensional virtual space and disposing map objects in the virtual space in which the first user and the second user move, wherein the first user and the second user are free to move in a common real-world playfield corresponding to the virtual space in which the map objects are disposed;
a virtual camera control process of controlling a first virtual camera and a second virtual camera in the virtual space, the first virtual camera being controlled by a point of view information about the first user in the real space, the second virtual camera being controlled by a point of view information about the second user in the real space;
a display process of generating, as three dimensional virtual images, a first display image and a second display image separate from the first display image, the first display image being an image of the game space viewed from the first virtual camera and displayed on a first head mounted display worn by the first user, the second display image being an image of the game space viewed from the second virtual camera and displayed on a second head mounted display worn by the second user, the first head mounted display displaying the first display image of the virtual space corresponding to a direction in which the first user is facing regardless of which direction the first user is facing in 360 degrees, the second head mounted display displaying the second display image of the virtual space corresponding to a direction in which the second user is facing regardless of which direction the second user is facing in 360 degrees; and
a change process of:
determining whether the first user and the second user in the real space satisfy a given positional relationship, and
changing at least one of (i) a three dimensional image of a user character corresponding to the first user in the second display image viewed from the second virtual camera based on the point of view information about the second user in the real space and (ii) a three dimensional image of another user character corresponding to the second user in the first display image viewed from the first virtual camera based on the point of view information about the first user in the real space, to a three dimensional image of a character of a different type in a changing process, in response to a physical positional relationship, as detected by the sensor, between the first user and the second user in the real space satisfying the given positional relationship in the real space, the given positional relationship being a contact positional relationship in which the first user and the second user are physically in contact with each other or a proximal positional relationship in which the first user and the second user are physically close to each other.

2. The simulation system as defined in claim 1, wherein in the change process, the processor performs a process of changing a display mode of the image of the user character or the image of the other user character, in accordance with operation information about the first user or the second user, or a status of the first user or the second user regarding the game.

3. The simulation system as defined in claim 1, wherein in the change process, the processor performs a process of changing a display mode of the image of the user character or an image of a disposed object in the virtual space when a change condition is determined to be satisfied by the first user and the disposed object being in the given positional relationship.

4. The simulation system as defined in claim 1, wherein the processor is configured to perform the change process in accordance with a type of the user character, or a type of the other user character.

5. The simulation system as defined in claim 1, wherein the processor is configured to perform the change process in accordance with relationship information between the first user and the second user.

6. The simulation system as defined in claim 1, wherein the processor is configured to perform the change process in accordance with a game level or a gameplay history of the first user or the second user.

7. The simulation system as defined in claim 1, wherein in the change process, the processor performs a game mode change process when a change condition based on the given positional relationship is determined to be satisfied.

8. The simulation system as defined in claim 7, wherein in the game process, the processor performs
a game result calculation process, and
in the change process, the processor performs, as the game mode change process,
changing a calculation scheme for the game result when the change condition is satisfied.

9. The simulation system as defined in claim 7, wherein in the change process, the processor performs, as the game mode change process, a role change process for the first user or the second user in the game when the change condition is satisfied to change the image of the user character or the other user character into an image of a character corresponding to a changed role.

10. The simulation system as defined in claim 9, wherein in the change process, the processor performs a process of limiting the role change process.

11. The simulation system as defined in claim 7, wherein a limited time period is set for the gameplay after the game is started, and
in the change process, the processor performs varying a change mode of the game mode in accordance with a timing at which the change condition is satisfied.

12. The simulation system as defined in claim 7, wherein a plurality of users playing in the real space are assigned to first to M-th roles, with M being an integer equal to or larger than 2, and
in the change process, the processor performs the game mode change process based on percentage information about a number of users assigned to each of the first to the M-th roles.

13. The simulation system as defined in claim 1, wherein the processor is configured to perform a notification process for a positional relationship status among a plurality of users playing the game, or a change status of the change process.

14. The simulation system as defined in claim 1, wherein in the change process, the processor performs determining that a change condition is satisfied when the first user and the second user are determined to be in the given positional relationship and the first user is determined to have performed a given action.

15. The simulation system as defined in claim 1, wherein in the virtual space setting process, the processor performs
disposing a route setting object, for setting a route in which the first user moves, in the virtual space, and
in the game process, the processor performs
a process for the game played by the first user by moving along the route.

16. The simulation system as defined in claim 15, wherein in the game process, the processor performs a penalty process performed on the first user when the first user is determined to have moved through the route setting object or to have come into contact with the route setting object.

17. The simulation system as defined in claim 1, further comprising:
one or more measurement devices installed in the common real-world playfield; and
one or more tracking devices disposed on each of the first and second head mounted displays worn by the first and second users in the common real-world playfield, the one or more tracking devices being one of light-emitting and light-receiving devices, and the one or more measurement devices being the other of the light-emitting and light-receiving devices,
wherein the point of view information about the first user is detected by light emitted and received by the one or more measurement devices installed in the common real-world playfield and the one or more tracking devices disposed on the first head mounted display worn by the first user, and the point of view information about the second user is detected by light emitted and received by the one or more measurement devices installed in the common real-world playfield and the one or more tracking devices disposed on the second head mounted display worn by the second user.

18. A process method comprising:
performing an information acquiring process of acquiring position information about a first user and a second user each moving in a real space, the position information being detected by at least one sensor;
performing a game process of executing a game played by the user;
performing a virtual space setting process of setting a virtual space, which is a three dimensional virtual space and disposing map objects in the virtual space in which the first user and the second user move, wherein the first user and the second user are free to move in a common real-world playfield corresponding to the virtual space in which the map objects are disposed;

performing a virtual camera control process of controlling a first virtual camera and a second virtual camera in the virtual space, the first virtual camera being controlled by a point of view information about the first user in the real space, the second virtual camera being controlled by a point of view information about the second user in the real space;

performing a display process of generating, as three dimensional virtual images, a first display image and a second display image separate from the first display image, the first display image being an image of the game space viewed from the first virtual camera and displayed on a first head mounted display worn by the first user, the second display image being an image of the game space viewed from the second virtual camera and displayed on a second head mounted display worn by the second user, the first head mounted display displaying the first display image of the virtual space corresponding to a direction in which the first user is facing regardless of which direction the first user is facing in 360 degrees, the second head mounted display displaying the second display image of the virtual space corresponding to a direction in which the second user is facing regardless of which direction the second user is facing in 360 degrees;

determining whether the first user and the second user in the real space satisfy a given positional relationship; and changing at least one of (i) a three dimensional image of a user character corresponding to the first user in the second display image viewed from the second virtual camera based on the point of view information about the second user in the real space and (ii) a three dimensional image of another user character corresponding to the second user in the first display image viewed from the first virtual camera based on the point of view information about the first user in the real space, to a three dimensional image of a character of a different type in a changing process, in response to a physical positional relationship, as detected by the sensor, between the first user and the second user in the real space satisfying the given positional relationship in the real space, the given positional relationship being a contact positional relationship in which the first user and the second user are physically in contact with each other or a proximal positional relationship in which the first user and the second user are physically close to each other.

19. A non-transitory computer-readable information storage medium storing a program that causes a computer to perform steps comprising:

performing an information acquiring process of acquiring position information about a first user and a second user each moving in a real space, the position information being detected by at least one sensor;

performing a game process of executing a game played by the first user and the second user;

performing a virtual space setting process of setting a virtual space, which is a three dimensional virtual space and disposing map objects in the virtual space in which the first user and the second user move, wherein the first user and the second user are free to move in a common real-world playfield corresponding to the virtual space in which the map objects are disposed;

performing a virtual camera control process of controlling a first virtual camera and a second virtual camera in the virtual space, the first virtual camera being controlled by a point of view information about the first user in the real space, the second virtual camera being controlled by a point of view information about the second user in the real space;

performing a display process of generating, as three dimensional virtual images, a first display image and a second display image separate from the first display image, the first display image being an image of the game space viewed from the first virtual camera and displayed on a first head mounted display worn by the first user, the second display image being an image of the game space viewed from the second virtual camera and displayed on a second head mounted display worn by the second user, the first head mounted display displaying the first display image of the virtual space corresponding to a direction in which the first user is facing regardless of which direction the first user is facing in 360 degrees, the second head mounted display displaying the second display image of the virtual space corresponding to a direction in which the second user is facing regardless of which direction the second user is facing in 360 degrees;

determining whether the first user and the second user in the real space satisfy a given positional relationship; and changing at least one of (i) a three dimensional image of a user character corresponding to the first user in the second display image viewed from the second virtual camera based on the point of view information about the second user in the real space and (ii) a three dimensional image of another user character corresponding to the second user in the first display image viewed from the first virtual camera based on the point of view information about the first user in the real space, to a three dimensional image of a character of a different type in a changing process, in response to a physical positional relationship, as detected by the sensor, between the first user and the second user in the real space satisfying the given positional relationship in the real space, the given positional relationship being a contact positional relationship in which the first user and the second user are physically in contact with each other or a proximal positional relationship in which the first user and the second user are physically close to each other.

* * * * *